(12) United States Patent
Misra et al.

(10) Patent No.: US 9,836,301 B2
(45) Date of Patent: *Dec. 5, 2017

(54) COMPONENT DISCOVERY FROM SOURCE CODE

(71) Applicant: Accenture Global Services Limited, Dublin (IE)

(72) Inventors: Janardan Misra, Bangalore (IN); Annervaz K. M., Bangalore (IN); Vikrant Shyamkant Kaulgud, Karvenagar (IN); Shubhashis Sengupta, Bangalore (IN); Gary Titus, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,207

(22) Filed: Mar. 21, 2016

(65) Prior Publication Data
US 2016/0202967 A1     Jul. 14, 2016

Related U.S. Application Data

(63) Continuation of application No. 14/504,194, filed on Oct. 1, 2014, now Pat. No. 9,323,520, which is a (Continued)

(30) Foreign Application Priority Data

Apr. 9, 2012 (IN) .......................... 1399/CHE/2012

(51) Int. Cl.
*G06F 9/44* (2006.01)
*G06F 17/30* (2006.01)
*G06Q 10/06* (2012.01)

(52) U.S. Cl.
CPC ................. *G06F 8/70* (2013.01); *G06F 8/315* (2013.01); *G06F 8/73* (2013.01); *G06F 8/74* (2013.01);
(Continued)

(58) Field of Classification Search
CPC ..... G06F 8/74; G06F 8/75; G06F 8/73; G06F 8/34; G06F 8/30; G06F 8/20
(Continued)

(56) References Cited

U.S. PATENT DOCUMENTS 6,088,739 A * 7/2000 Pugh ..................... G06F 9/4428
                                                            703/22
7,792,770 B1    9/2010 Phoha et al.
(Continued)

OTHER PUBLICATIONS

Mark Shtern, "Methods for evaluating, selecting and improving software clustering algorithms", May 2010, Computer Science and Engineering, York University, Toronto, Ontario, Canada, 236 pages, relevant pp. 22-72.
(Continued)

*Primary Examiner* — Anna Deng
(74) *Attorney, Agent, or Firm* — Mannava & Kang, P.C.

(57) ABSTRACT

A method for component discovery from source code may include receiving source code, and determining business classes by excluding packages and classes in the source code identified as belonging to a presentation layer, as belonging to a data access layer, as models and/or as utilities. The method may further include extracting multi-dimensional features from the business classes, estimating similarity for business class pairs based on the extracted multi-dimensional features, clustering the business classes based on the similarity and mapping functional concepts to the clusters. The clusters generated by the clustering may represent components of the source code. The method may also
(Continued)

include determining interfaces for the components based on the clustering.

20 Claims, 18 Drawing Sheets

Related U.S. Application Data continuation of application No. 13/494,469, filed on Jun. 12, 2012, now Pat. No. 8,881,104.

(52) U.S. Cl.
CPC .......... *G06F 8/75* (2013.01); *G06F 17/30598* (2013.01); *G06Q 10/06* (2013.01)

(58) Field of Classification Search
USPC ........................................................ 717/107
See application file for complete search history.

(56) References Cited

U.S. PATENT DOCUMENTS

| | | | |
|---|---|---|---|
| 8,478,674 B1 | 7/2013 | Kapczynski et al. | |
| 2006/0143198 A1* | 6/2006 | Okamoto | G06Q 10/06 |
| 2008/0046870 A1* | 2/2008 | Nair | G06F 8/443 717/140 |
| 2008/0140707 A1* | 6/2008 | Lang | G06K 9/6219 |
| 2012/0030649 A1* | 2/2012 | Chapa | G06F 8/458 717/106 |
| 2012/0143800 A1 | 6/2012 | Zhou et al. | |

OTHER PUBLICATIONS

Maqbool O et al, "Hierarchical Clustering for Software Architecture Recovery", IEEE Transactions on Software Engineering, IEEE Service Center, Los Alamitos, CA, US, vol. 33, No. 11, Nov. 2007, pp. 759-780.

Mancoridis S et al, "Using Automatic Clustering to Produce High-Level System Organizations of Source Code", Program Comprehension, 1998. IWPC '98. Proceedings., 6th International Workshop on Ischia, Italy Jun. 24-26, 1998, Los Alamitos, CA, USA, IEEE Comp. Soc, US, Jun. 24, 1998, pp. 45-52.

"Search Report on EP Application 13001439.2", European Patent Office, Jan. 28, 2014, 8 pages.

* cited by examiner

COMPONENT DISCOVERY FROM SOURCE CODE

PRIORITY

This application is a Continuation of commonly assigned and copending U.S. patent application Ser. No. 14/504,194, filed Oct. 1, 2014, which is a Continuation of U.S. patent application Ser. No. 13/494,469, filed Jun. 12, 2012, now U.S. Pat. No. 8,881,104, issued Nov. 4, 2014, which claims foreign priority to Indian Application Serial Number 1399/CHE/2012, filed Apr. 9, 2012, entitled "COMPONENT DISCOVERY FROM SOURCE CODE", which are incorporated by reference in their entireties.

BACKGROUND

When comprehending an application, one aspect of comprehension may include understanding the coarse-grained structure of the application in terms of functionally cohesive groups of program units in the application. The functionally cohesive groups may be designated as components of the application. Using such a view, a user trying to comprehend the application can grasp the functionality and how the functionally cohesive groups of program units interact with each other. Due to factors, such as, for example, lack of documentation or unavailability of updated documentation for an application, a component level view of an application can be difficult to achieve. Further, for large scale applications, manual component discovery can be challenging.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
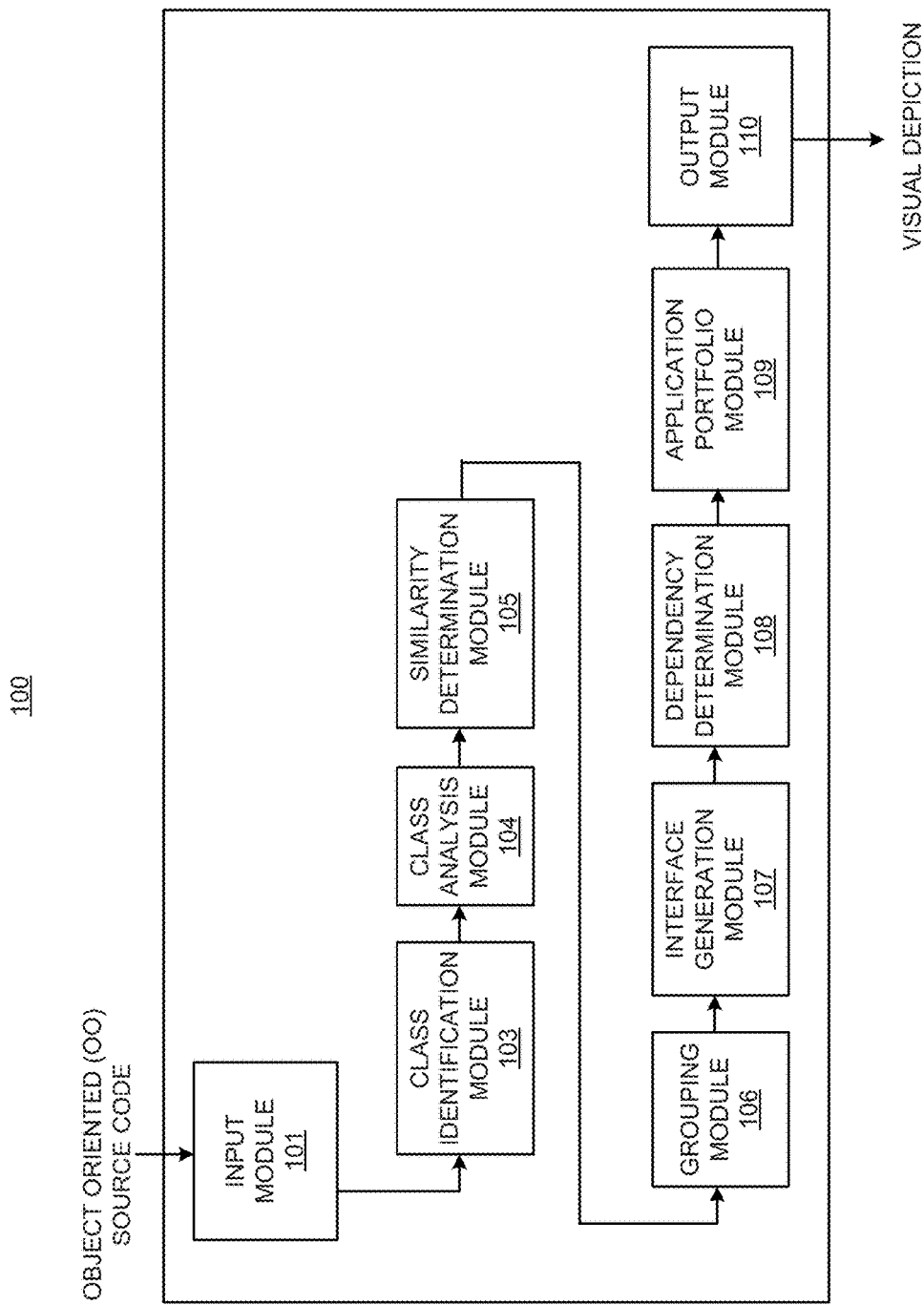
FIG. 1 illustrates an architecture of a component discovery system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A component discovery system and a method for component discovery are described herein and provide automated discovery of components, for example, for applications. Visualization of components including their interrelations with each other may also be provided. A user, without any prior knowledge of an application, may input object oriented (OO) source code and corresponding byte-code for the application into the component discovery system, and receive a functional perspective of core components of the application, for example, in the form of a visual component depiction. A user may also input user preferences and aspects related to configuration set-up. The output of the system and method may include, for example, a graph or a block diagram displaying automatically labeled components of the application source code, hierarchical relationships between the components, interfaces between the components, and interactions between the components. The system and method may also provide for component refinement, and facilitate attachment of functional concepts to components, for example, for exploring the output and for output comprehension. The functional concepts may be automatically mapped to the components.

The system and method may use a multidimensional view of the input source code for component discovery. Thus, the source code elements may be characterized in terms of a comprehensive set of features related to the source code elements and their inter dependencies. For example, the implicit assumptions and intentions of the source code design may be captured by linguistic features. The concepts embedded into the identifier names, inheritance and interface realization relationships, and packaging hierarchies may be captured by programming features. The execution level interactions among source code elements may be captured by dependency features. Further, similarity measures may be defined based on the type and quality of the extracted features.

The system and method may use a static profile of the source code, without using run time information from code execution. Thus, no empirical tests are needed on an application under consideration. Further, for an application under consideration, no historical test results need to be evaluated or performed on a similar class of applications. The system and method further perform automated weighing measures on source code features for improving accuracy of similarity measures.

In an example, the component discovery system may include a memory storing a module comprising machine readable instructions to receive source code, and determine business classes by excluding packages and classes in the source code identified as belonging to a presentation layer, as belonging to a data access layer, as models and/or as utilities. The machine readable instructions may further extract features from the business classes, estimate similarity for business class pairs based on the extracted features, and cluster the business classes based on the similarity. The clusters generated by the clustering may represent components of the source code. The machine readable instructions may further determine interfaces for the components based on the clustering. The component discovery system may further include a processor to implement the module.

In an example, the method for component discovery from source code may include receiving source code, and determining business classes by excluding packages and classes in the source code identified as belonging to a presentation layer, as belonging to a data access layer, as models and/or as utilities. The method may further include extracting features from the business classes, estimating similarity for business class pairs based on the extracted features, and clustering the business classes based on the similarity. The clusters generated by the clustering may represent components of the source code. The method may also include determining interfaces for the components based on the clustering.

In an example, a non-transitory computer readable medium having stored thereon machine readable instructions for component discovery is also described. The machine readable instructions that when executed may cause a computer system to receive source code, and determine business classes by excluding packages and classes in the source code identified as belonging to a presentation layer, as belonging to a data access layer, as models and/or as utilities. The machine readable instructions may further cause the computer system to extract features from the business classes, estimate similarity for business class pairs based on the extracted features, and cluster the business classes based on the similarity. The clusters generated by the clustering may represent components of the source code. The machine readable instructions may further cause the computer system to determine interfaces for the components based on the clustering.

The component discovery system and method may thus provide a component view by grouping together functionally cohesive sections of source code. Such component discovery may uncover hidden relationships between source code classes. For example, over the course of application development, functionally or technically related classes may become dispersed across an application. Components discovered by the system and method may uncover this otherwise implicit or hidden information, which may facilitate functional comprehension of an application.

The system and method described herein provide a technical solution to the technical problem of component discovery for applications. In many instances, manual component discovery is not a viable solution given the size and complexity of source code, and variability involved in manual component discovery, which can lead to inconsistent results. The system and method described herein provide the technical solution of objectively discovering components of an application based on, for example, automatic scoping and identification of classes to be analyzed in source code, feature extraction for similarity assessment, similarity estimation, cluster generation, generation of interfaces between classes for clusters, inter-component dependency determination, and generation of a visual depiction of the components based on the interfaces and inter-component dependencies.

FIG. 1 illustrates an architecture of a component discovery system 100, according to an example of the present disclosure. The component discovery system 100 may generally include an input module 101 that may include a user interface 102 (see FIG. 4) to receive object oriented (OO) source code to be analyzed. The user interface 102 may further provide for user input, for example, for configuration set-up and component refinement, as described below. A class identification module 103 may scope and identify classes to be analyzed in the source code. For example, the class identification module 103 may identify classes in a business layer of the source code. A class analysis module 104 may extract features for similarity assessment for each identified class. A similarity determination module 105 may estimate a similarity between identified classes by analyzing the extracted features. For example, the similarity determination module 105 may estimate a similarity between pairs of identified classes. A grouping module 106 may generate clusters within the source code by grouping similar classes. The clusters may be designated as components of an application and labeled as discussed below. An interface generation module 107 may generate interfaces between classes for each cluster. A dependency determination module 108 may determine inter-component dependencies. An application portfolio module 109 may provide clustering of application portfolios. An output module 110 may provide for automatic labeling of the clusters and thereby providing names for components of an application, generation of a visual depiction of the components based on the interfaces and inter-component dependencies, identification of borderline classes, mapping of functional entities to components, and component hierarchy determination.

As described herein, the modules and other elements of the system 100 may comprise machine readable instructions stored on a non-transitory computer readable medium. In addition, or alternatively, the modules and other elements of the system 100 may comprise hardware or a combination of machine readable instructions and hardware.

Figure 4:
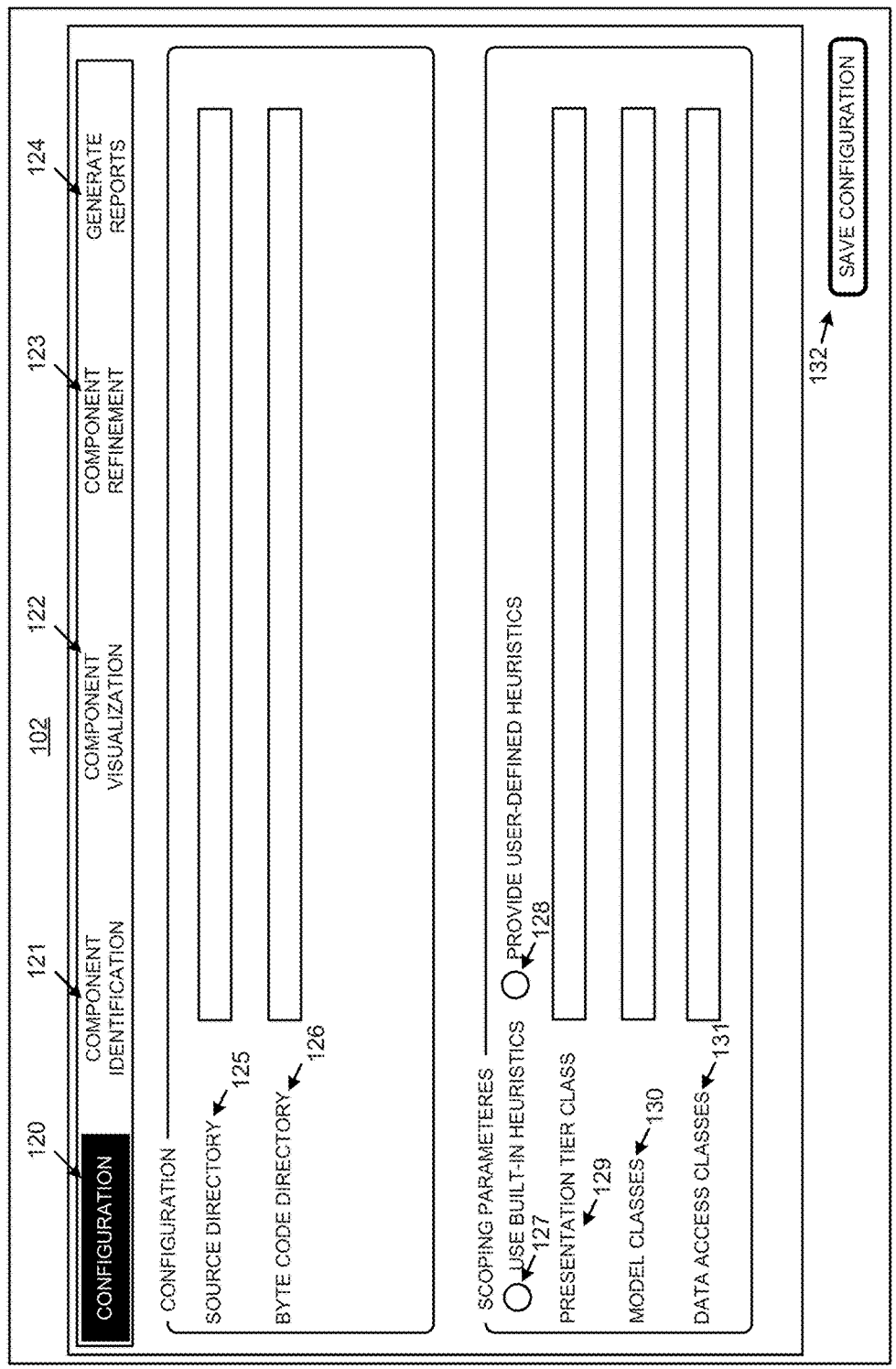
FIG. 4 illustrates a user interface layout for configuration set-up for the component discovery system, according to an example of the present disclosure.

Referring to FIGS. 1 and 4, the input module 101 may include the user interface 102 to receive OO source code to be analyzed and corresponding bytecode. The input module 101 may also receive user inputs for identifying packages and classes for performing data access, presentation layer packages and classes, models, and utilities that may be both technical and application specific. In the absence of user input, the packages and classes identified into the data access layer, presentation layer, or as models and utilities may be automatically identified using built-in heuristics. The input module 101 may also receive user inputs for functional knowledge. For example, the input module 101 may receive user provided textual descriptions of functional entities. The functional knowledge may provide a set of functional concept (e.g., words and/or phrases) representing functional entity names. In the absence of user input, components may be automatically labeled by the output module 110 based on the responsibilities of the component.

The user interface 102 may include, for example, options for selecting configuration set-up at 120, component identification at 121, component visualization at 122, component refinement at 123 and report generation at 124. For the configuration set-up at 120, a user may enter source code directory information at 125 and byte code directory information at 126. The user may further select scoping and identification of classes by the class identification module 103 using built-in heuristics at 127 or user-defined heuristics at 128. For the user-defined heuristics at 128, the user may enter presentation tier classes at 129, model classes at 130 and data access classes at 131. With the configuration set-up for the component discovery system 100 complete, the configuration may be saved at 132.

Referring to FIG. 1, the class identification module 103 is described.

The class identification module 103 may scope and identify classes to be analyzed in the source code. For example, the class identification module 103 may identify classes in a business layer of the source code. Based, for example, on user inputs and/or built-in heuristics, the class identification module 103 may determine a component identification boundary by excluding those packages and classes which are identified in a presentation layer, a data access layer (DA), as models, or utilities that may be both technical and application specific. For example, the presentation layer may include classes in web package, or packages and classes ending with action or extending an action class. Models may include classes with the suffixes VO (i.e., value object), DVO (i.e., data value object), DTO (i.e., data transfer object) or getter and setter methods (excluding constructor, hashCode, equals and toString). Data access classes may include classes with the suffixes DAO (i.e., data access object), Dao, dao, or include a hibernate session and query. Utilities may include, for example, classes that perform standard functions such as string operations, date/time functions, standard data structures, set enumeration etc., common technical services such as logging and auditing or may be application-specific utility functions such as input validation functions etc. With packages and classes identified in the presentation layer, DA layer, as models, or utilities excluded, in order to identify classes in the business layer, classes with the suffixes manager, service or EJB (i.e., Enterprise JavaBeans) session beans may be identified. These classes in the business layer may be considered for component discovery by the class analysis module 104.

Referring to FIG. 1, the class analysis module 104 is described.

The class analysis module 104 may extract features for similarity assessment for each identified class. Input to the class analysis module 104 may include classes in the business layer identified by the class identification module 103. Output of the class analysis module 104 may include a set of extracted features for each class and inter-class structural dependencies. Generally, for each class within an application, tokens may be extracted from source code comments and identifiers. Concept words embedded in the class names may be extracted. Concept words embedded in the public method identifiers may also be extracted. The class analysis module 104 may also extract packaging information, and inheritance and interface realization relationships. The inheritance and interface realization relationships may be extracted for each pair of classes within an application. The class analysis module 104 may further extract structural dependencies.

The information extracted by the class analysis module 104 may be generally classified as textual features, code features, packaging information, inheritance and interface realization relationships, and structural dependency features. This information may be used to provide a multidimensional view of the input source code for component discovery.

With regard to textual feature extraction, the class analysis module 104 may extract intermediate representation (IR) tokens from code comments and identifiers. For example, for each class file, the class analysis module 104 may extract code comment strings and identifiers for public variables from the source code. The class analysis module 104 may further extract a list of words from code comment strings and variable identifiers by splitting the code comment strings into separate words and by applying tokenization on each word. For example, the code comment string "This ControllerCiass will schedule processes" may be separated into words {"This", "ControllerClass", "will", "schedule", "processes"} and the tokens {"This", "Controller", "Class", "will", "schedule", "processes"} may be extracted. For the lists generated by extracting the list of words from code comment strings and variable identifiers, reserved words may be removed. For example, JAVA language specific reserved words such as, for example, abstract, Boolean, break etc., may be removed. For the lists generated by extracting the list of words from code comment strings and variable identifiers, stop words, such as, for example, able, about, above etc., may be removed. Further, word stemming may be applied to bring words to their roots. For example, word stemming may be applied to bring "booking" and "booked" to the root word "book".

With regard to code feature extraction, the class analysis module 104 may extract concept words embedded in class names. For example, for each class file, strings representing a class name may be extracted. For the extracted strings, a string tokenizer may be used to extract a list of concepts words. The class analysis module 104 may extract concept words embedded in public method identifiers. For example, for each class file, a list of strings that include identifiers of the public methods used in the class may be extracted. For each extracted string, a string tokenizer may be applied to extract a list of concepts words.

With regard to packaging information extraction, the class analysis module 104 may extract packaging information for each class. For each class file, the class analysis module 104 may extract its packaging hierarchy as a string, and extract a substring describing each individual hierarchy separated by a dot (i.e., '.'). For example, if packaging for a class is "com.atl.application.controlManager", the packaging may be separated into a list of strings {"com", "atl", "application", "control", "Manager"}.

With regard to inheritance and interface realization relationship extraction, the class analysis module 104 may extract inheritance and interface realization relationships for each class. For each class file, the class analysis module 104 may collect a list of class-names or interfaces which may be extended or implemented by a class. This may be indicated in the source code by reserved words, such as, for example, extends and implements. This list may be denoted an inheritance and interface realization relationship list. For example, if a class definition for class ClientAnalytics is that class ClientAnalytics implements Business, Analytics, Client{ . . . }, the interface realization relationship list for the class ClientAnalytics would be {Business, Analytics, Client}.

With regard to structural dependency feature extraction, the class analysis module 104 may populate a dependency graph $G_{dep}$ from the byte code. The dependency graph $G_{dep}$ may include nodes representing classes. Each edge between two nodes (e.g., node A and node B) may represent that there is a function call (i.e., a method call) in the source code of Class A, where a function (e.g., a public method) of Class B is called. Each edge may include information regarding the input and output parameter types for the called method. Any two nodes may include multiple directed edges therebetween.

Referring to FIG. 1, the similarity determination module 105 is described.

The similarity determination module 105 may calculate class to class similarity scores based on the features extracted by the class analysis module 104. Specifically, the similarity determination module 105 may calculate class to class similarity scores based, for example, on vector space model based estimation of textual similarity, estimation of class name similarity, calculation of class name similarity between each pair of classes, estimation of method name similarity, estimation of packaging based similarity, estimation of inheritance and interface realization relationship based similarity, estimation of structural similarity, and estimation of a combined similarity between each pair of classes.

With regard to vector space model based estimation of textual similarity, the similarity determination module 105 may populate a co-occurrence matrix. For the co-occurrence matrix, let $D=<Class_1, Class_2, \ldots, Class_d>$ be the sequence of classes in the source code, where d is the total number of classes in the source code. Further, let T be the sequence of all unique IR tokens occurring across the classes, where T is the union of all the IR tokens extracted, as discussed above, by the class analysis module 104 for textual feature extraction. For t being the number of IR tokens in T, a co-occurrence matrix C of size d×t may be created such that C[i, j]=frequency of occurrence of $j^{th}$ IR token (from 7) in the $i^{th}$ class (from D). Rows of C (denoted as, C[1], C[2], C[d]) may be denoted document vectors. Each document vector C[i] may correspond to the $i^{th}$ class in D and measures the frequency of occurrence of various IR tokens in that class. Next, term frequency-inverse document frequency (tf-idt) based automated weighting may be applied. Specifically, for each i∈[1 . . . d] and j∈[1 . . . t]:

$$C[i, j] \leftarrow C[i, j] \times \log\left(\frac{d}{n}\right) \quad \text{Equation (1)}$$

For Equation (1), d may denote the total number of documents (i.e., classes) under consideration, and n may denote the number of documents (i.e., classes) where the $j^{th}$ IR token appears. Factor ln $$\left(\frac{d}{n}\right)$$

may be referred as an IDE (inverse document frequency). In order to calculate cosine similarity between each pair of classes, for each i, j∈[1 . . . d] and i≤j, let C[i] and C[j] be the document vectors from the co-occurrence matrix C corresponding to the $i^{th}$ and $j^{th}$ classes. The textual similarity may be therefore determined as follows:

$$\delta_{textual}[i, j] = \frac{\sum_{r=1}^{r=t} C[i, r]C[j, r]}{\sqrt{\sum_{r=1}^{r=t} C[i, r]^2} \sqrt{\sum_{r=1}^{r=t} C[j, r]^2}} \quad \text{Equation (2)}$$

With regard to estimation of class name similarity, the similarity determination module 105 may populate a class name matrix. For the class name matrix, let $Z_c$ be the sequence of all unique word concepts appearing in the lists generated for code feature extraction by the class analysis module 104 for extraction of concept words embedded in class names. $Z_c$ may be defined as the set-union of all the word concepts extracted for code feature extraction by the class analysis module 104. For example, as discussed above for the class analysis module 104, for the extracted strings, a string tokenizer may be used to extract a list of concepts words. Next, a class name matrix $W_{class}$ of size $d \times z_c$ may be created such that $W_{class}[i, j]$=frequency of occurrence of $j^{th}$ word concept (in $Z_c$) for the $i^{th}$ Class (in D). The rows of $W_{class}$ (denoted as, $W_{class}[1], W_{class}[2], \ldots, W_{class}[d]$) may correspond to the classes in D and measure the frequency of occurrence of various word concepts in that class name. Next, tf-idf based automated weighting may be applied. For the automated weighting, for each i∈[1 . . . d] and j∈[1 . . . $z_c$]:

$$W_{class}[i, j] \leftarrow W_{class}[i, j] \times \log\left(\frac{d}{n}\right) \quad \text{Equation (3)}$$

For Equation (3), d may denote the total number of classes in the application, and n may denote the number of rows in $W_{class}$, where $W_{class}[-,j]>0$. Next, with regard to calculation of class name similarity between each pair of classes, the similarity determination module 105 may proceed as follows. For each i, j∈[1 . . . d] and i≤j, let $W_{class}[i]$ and $W_{class}[j]$ be the row vectors from $W_{class}$ corresponding to the $i^{th}$ and $j^{th}$ classes in D. The similarity may be measured as follows:

$$\delta_{class}[i, j] = \frac{\sum_{r=1}^{r=z_c} \min\{W_{class}[i, r], W_{class}[j, r]\}}{\sum_{r=1}^{r=z_c} \max\{W_{class}[i, r], W_{class}[j, r]\}} \quad \text{Equation (4)}$$

For Equation (4), min{ . . . } and max{ . . . } may respectively return the minimum and maximum of the arguments.

With regard to estimation of method name similarity, the similarity determination module 105 may populate a method name matrix. For the method name matrix, let $Z_m$ be the sequence of all unique word concepts appearing in the lists generated for code feature extraction by the class analysis module 104 for extraction of concept words embedded in the public method identifiers. $Z_m$ may denote the set-union of all the word concepts extracted for code feature extraction by the class analysis module 104. For example, as discussed above for the class analysis module 104, for the extracted strings, a string tokenizer may be used to extract a list of concepts words. Next, by letting $z_m$ be the total number of word concepts in $Z_m$, a method name matrix $W_{method}$ of size $d \times Z_m$ may be created such that $W_{method}[i, j]$=frequency of occurrence of $j^{th}$ word concept (in $Z_m$) for the $i^{th}$ class (in D). Rows of $W_{method}$ denoted, for example, as $W_{method}[1]$, $W_{method}[2]$, ..., $W_{method}[d]$, may correspond to the classes in D and measure the frequency of occurrence of various word concepts embedded in the public methods of the class. Next, tf-idf based automated weighting may be applied. For each $i \in [1 \ldots d]$ and $j \in [1 \ldots z_c]$:

$$W_{method}[i, j] \leftarrow W_{method}[i, j] \times \log\left(\frac{d}{n}\right) \quad \text{Equation (5)}$$

For Equation (5), d may denote the total number of classes in the application, and n may denote the number of rows in $W_{method}$, where $W_{method}[-, j] > 0$. Next, with regard to calculation of method name similarity between each pair of classes, the similarity determination module 105 may proceed as follows. For each i, $j \in [1 \ldots d]$ and $i \leq j$, let $W_{method}[i]$ and $W_{method}[j]$ be the row vectors from $W_{method}$ corresponding to the $i^{th}$ and $j^{th}$ classes in D. For these row vectors, the similarity may be measured as follows:

$$\delta_{method}[i, j] = \frac{\sum_{r=1}^{r=m} \min\{W_{method}[i, r], W_{method}[j, r]\}}{\sum_{r=1}^{r=z_m} \max\{W_{method}[i, r], W_{method}[j, r]\}} \quad \text{Equation (6)}$$

With regard to estimation of packaging based similarity, the similarity determination module 105 may calculate packaging similarity between each pair of classes as follows. For each i, $j \in [1 \ldots d]$ and $i \leq j$, let $W_{package}[i]$ and $W_{package}[j]$ be the lists corresponding to the $i^{th}$ and $j^{th}$ classes in D as generated for code feature extraction by the class analysis module 104 for extraction of packaging information for each class. The packaging similarity between these classes may be measured as a Jaccard Coefficient as follows:

$$\delta_{package}[i, j] = \frac{|W_{package}[i] \cap W_{package}[j]|}{|W_{package}[i] \cup W_{package}[j]|} \quad \text{Equation (7)}$$

For Equation (7), the function | ... | measures the size of the set. The symbols ∩ and ∪ respectively denote set intersection and set union operators.

With regard to estimation of inheritance and interface realization relationship based similarity, the similarity determination module 105 may proceed as follows. With regard to reflexivity, for each class in D, the similarity determination module 105 may include the class name in its inheritance and interface realization list generated for code feature extraction by the class analysis module 104 for extraction of inheritance and interface realization relationships for each class. With regard to symmetry, for each class in D, the similarity determination module 105 may include the names of all those classes in its inheritance and interface realization list, which have the current class in their inheritance and interface realization lists. With regard to symmetry, for each class in D, the similarity determination module 105 may calculate inheritance or interface realization based similarity between each pair of classes. Specifically, for each i, $j \in [1 \ldots d]$ and $i \leq j$, let $W_{in}[i]$ and $W_{in}[j]$ be the inheritance and interface realization lists corresponding to the $i^{th}$ and $j^{th}$ classes in D. Inheritance and interface realization similarity between these classes may be measured as follows:

$$\delta_{in}[i, j] = \frac{|W_{in}[i] \cap W_{in}[j]|}{|W_{in}[i] \cup W_{in}[j]|} \quad \text{Equation (8)}$$

With regard to estimation of structural similarity, the similarity determination module 105 may collapse edges with same method name. For collapsing edges with same method name, for each pair of vertices $(u, v) \in G_{dep}$ the similarity determination module 105 may merge all the outbound edges of u (i.e., edges starting from vertex u and ending at vertex v) having the same method name as their attribute to a single outbound edge from vertex u to vertex v with a first attribute as the number of edges that are merged and a second attribute as the method name. All inbound edges of vertex u (i.e., edges starting from vertex v and ending at vertex u) may be merged in the same manner. For vertex v, the outbound and inbound edges may be merged in the same manner as discussed above for the outbound and inbound edges of vertex u. The similarity determination module 105 may next proceed with automated weighing. For automated weighing, for each vertex $u \in G_{dep}$, and for each inbound edge of u, the edge count (i.e., the second attribute) may be divided with the sum of the edge counts of all those edges having the same method name. The similarity determination module 105 may next proceed with collapsing edges between each pair of vertices. For each pair of vertices $(u, v) \in G_{dep}$, all the outbound edges of u and v may be merged to a single undirected edge between u and v with summation of all the edge counts of all these attributes as the only attribute of the merged edge as its weight. The similarity determination module 105 may next proceed with weight normalization. For weight normalization, the similarity determination module 105 may first determine the maximum weight of the edges in $G_{dep}$, with the maximum weight being denoted by $\mu$. For each edge $e \in G_{dep}$, the weight of each edge may be divided by $\mu$. The similarity determination module 105 may next proceed with estimation of structural similarity as follows. For each i, $j \in [1 \ldots d]$ and $i \leq j$, the structural similarity between the $i^{th}$ and $j^{th}$ classes may be determined as follows:

$$\delta_{structural}[i,j] = \text{weight of the edge in } G_{dep} \text{ between vertices corresponding to the } i^{th} \text{ and } j^{th} \text{ classes} \quad \text{Equation (9)}$$

With regard to estimation of combined similarity between each pair of classes, the similarity determination module 105 may choose a relative significance factor for each of the similarity measures estimated previously such that their sum is equal to one. The similarity measures estimated previously may include the vector space model based estimation of textual similarity, estimation of class name similarity, estimation of method name similarity, estimation of packaging based similarity, estimation of inheritance based similarity, and estimation of structural similarity. Specifically, with regard to estimation of combined similarity between each pair of classes, the similarity determination module 105 may determine the following significance factors:

$\alpha_{textual}$ significance factor for textual similarity (Default=0.1)

$\alpha_{class}$ significance factor for class name based similarity (Default=0.2)

$\alpha_{method}$: significance factor for method name based similarity (Default=0.1)

$\alpha_{packaging}$: significance factor for packaging based similarity (Default=0.2)

$\alpha_{inheritance}$: significance factor for inheritance based similarity (Default=0.2)

$\alpha_{structural}$: significance factor for structural similarity (Default=0.2)

For the foregoing significance factors, the values of the significance factors may be chosen such that:

$$\alpha_{textual} + \alpha_{class} + \alpha_{method} + \alpha_{packaging} + \alpha_{inheritance} + \alpha_{structural} = 1$$

For combined similarity, for each i, j∈[1 ... d] and i≤j, the combined similarity between the $i^{th}$ and $i^{th}$ classes may be determined as follows:

$$\delta_{Combined}[i,j] = \alpha_{textual} \times \delta_{textual}[i,j] \alpha_{class} \times \delta_{class}[i,j] + \alpha_{method} \times \delta_{method}[i,j] + \alpha_{packaging} \times \delta_{packaging}[i,j] + \alpha_{inheritance} \times \delta_{inheritance}[i,j] + \alpha_{structural} \times \delta_{structural}[i,j] \quad \text{Equation (10)}$$

Equation (10) may result in an extended dependence Graph $G_{ext\_dep}=(V, E, weight)$. Nodes in V may represent classes and edges (i.e., e=(u, v) in $E \subseteq V \times V$) with weight weight(e) between nodes may represent the combined similarity between a pair of classes.

Referring to FIG. 1, the grouping module 106 is described.

Generally, the grouping module 106 may generate initial clusters within the source code by grouping similar classes. The grouping module 106 may generate seed populations, which are described as seed populations 1-6 for facilitation a description thereof.

For seed population-1, the grouping module 106 may sort a list of edges in a non-increasing order. For the sorted list, the top quartile of the edges may be chosen, and the set of selected edges may be denoted $E_{topQ}$. The grouping module 106 may construct connected components using top weighted edges in $E_{topQ}$, given that both of the following two conditions continue to be met. A first condition may be met if there are edges in $E_{topQ}$ which are not used thus far in any of the connected component. A second condition may be met if a number of independent components are <2* (number of packages). Each connected component may thus give rise to a cluster. For each of the remaining nodes in $G_{ext\_dep}$ which are not considered in constructing connected components using top weighted edges in $E_{topQ}$, each of the remaining nodes may be associated to that cluster from which it has the least distance. The generated seed clusters may be designated $P_1$.

For seed population-2, the grouping module 106 may sort the list of edges in a non-increasing order. The set $E_{seed}$ of seed edges for initial clustering may be defined as $E_{seed}=\{$Set of edges with non-zero inheritance similarity$\}$. Connected components in the graph $G_{ext\_dep}$ may be identified using the selected edges only in $E_{seed}$, with each connected component giving rise to a cluster. For each of the remaining nodes in $G_{ext\_dep}$ which were not considered for identifying connected components in the graph using the selected edges in $E_{seed}$, the remaining nodes in $G_{ext\_dep}$ may be associated to that cluster from which it has the least distance. The generated seed clusters may be designated $P_2$.

For seed population-3, the grouping module 106 may choose each package of the application as a seed cluster. The generated seed clusters may be designated $P_3$.

For seed population-4, the grouping module 106 may select a random number n∈[1 ... d], where d is the number of classes. For each class, the grouping module 106 may generate a random number k∈[1 ... n] and assign the class to the cluster k. The generated seed clusters may be designated $P_4$.

For seed population-5, the grouping module 106 may select a random number n∈[1 ... d], where d is the number of classes. The grouping module 106 may generate initial clustering using k-means clustering with parameter k=n. The generated seed clusters may be designated $P_5$.

For seed population-6, the grouping module 106 may sort the list of edges in a non-increasing order. For the sorted list, the top quartile of the edges may be chosen, and the selected edges may be designated $E_{topQ}$. For each node, v∈V, the clique strength of the node may be calculated as follows:

$$\text{CliqueStrength}[v] = \Sigma_{[(v,u) \in E_{topQ} OR(v,w) \in E_{topQ}] AND [u,w) \in E_{topQ}]} w(u,w) \quad \text{Equation (11)}$$

Next, the nodes may be sorted based on their clique strengths. The top quartile of the nodes may be selected as cluster centers. For each of the remaining nodes, these nodes may be associated to that cluster from which it has maximum overall similarity. The generated seed clusters may be designated $P_6$.

The grouping module 106 may next test for clustering initiation for checking the modularity of the initial seed clusters. If the modularity is high, the grouping module 106 may return the initial seed clusters as the clustering. Otherwise, the clustering process may be continued by maximizing the modularisation quality (MQ). In order to test for clustering initiation, the grouping module 106 may estimate the density of the graph $G_{ext\_dep}$ as follows:

$$\text{density} = \Sigma_{e \in E} w(e) \quad \text{Equation (12)}$$

For each seed clustering $P_i$ (i.e., seed clusters $P_1$-$P_6$), if $$\left(MQ(P_i) > \frac{|P_i|}{2}\right),$$

where $|P_i|$ is the number of clusters in $P_i$, CloseToOptimal$_i$=True. If (density>0.5*|E|) and (CloseToOptimal$_1$ | ... | CloseToOptimal$_5$), the grouping module 106 may mark the seed-clustering for which MQ is maximum. This seed-clustering may not be used for further processing since it is already on an optimal level. Otherwise, the grouping module 106 may next proceed to generate partitions by maximizing MQ.

The grouping module 106 may generate partitions by maximizing MQ using a hill climbing and simulated annealing approach. For the generation of partitions, the variables temp, α, mqOld, and mqNew may be considered global. The generation of partitions may proceed as follows. For each of the seed clusters $P_1$, $P_2$, ..., $P_6$, which were not marked previously (i.e., seed-clustering other than that for which MQ is maximum):

(i)
mqOld=−1
currentP=$P_1$
temp=1000
α=0.7
simulatedAnnealingFlag=False
(ii)
mqNew=MQ_Init(currentP)
(iii)
If (mqNew is quite close to the number of clusters in currentP)
    return currentP (iv)
  while ((mqNew>mqOld) OR (simulatedAnnealingFlag==True))
    simulatedAnnealingFlag=False
    mqOld=mqNew
    nextP=ClimbHill(currentP)
    currentP=nextP
(v) return currentP Based on the foregoing generation of partitions, the grouping module 106 may return the clustering with the highest MQ. For the generation of partitions, for mqOld=−1, initially MQ may at the most be 0. For temp=1000, variable temp may represent the temperature for simulated annealing function SN( ), with default=1000. In general, the variable temp may be of the order of the number of classes in the application source. For α=0.7, variable α∈[0 . . . 1] may represent a cooling constant used while applying the simulated annealing, with the default=0.7. For mqNew=MQ_Init (currentP), this function may be used to estimate the modularization quality for initial clustering.

In order to generate partitions by maximizing MQ using a hill climbing approach, for ClimbHill( . . . ), the inputs may be clustering $P=\{C_1, C_2, \ldots, C_n\}$. The output may be new clustering, which is a 1-neighborhood of P, and may have an improved MQ. For a clustering P, the 1-neighbour nP may be defined as another clustering, which may be the same as P except that a single element (node) of a cluster in P may be in a different cluster in nP. Next, in order to generate partitions, the ClimbHill( . . . ) approach may proceed as follows:

Clustering BestP=P
  Int Diff[3]={0, 0, 0}
  Int Counter=0
  Boolean improved=false The Diff array may record the difference between a clustering and its 1-neighbor. Diff[0] may represent the index of the node in V, which may differ between the neighbors. Diff[1] may represent the index of the cluster, where the node Diff[0] originally was and Diff[2] may represent the index of the cluster where node currently is.

Next, to generate partitions, a greedy approach may be used as follows. For the greedy approach, for each node u in V, let C be the cluster in which u is currently present. The cluster $C^u \neq C$ may be identified from which u has maximum similarity, and $C^u$ may denote the target cluster for u. For each pair of clusters (C, C'), the number of nodes in C for which C' is the target cluster may be estimated. Based on this estimate, the cluster pairs may be sorted. Based on the sorted cluster pairs, the subset of nodes which can be moved from their current cluster to the target cluster and would increase the value of MQ maximally may be identified. The clustering after this movement may be returned. In the event no such movement is possible, the following 1-neighbourhood movement may be applied, where NumOfNeigh=|V|×|P| (i.e., number of nodes in $G_{ext\_dep}$)×(number of clusters in P):

While(Counter < NumOfNeigh)
{
  Clustering tempP = getNewNeigh(BestP, Diff[ ])
  Count = Counter + 1
  mqTemp = MQ_Rec(tempP, Diff[ ])
  if ((mqTemp > mqNew) OR SimAnneal(mqTemp, mqNew, temp))
  {
    BestP = C
    mqNew = mqTemp
    improved = true
    if(SN(mqTemp, mqNew, temp))
    {
      temp = α*temp
      simulatedAnnealingFlag == True
    }
  }
}
if (improved == true)
{
  return BestP
}

For (mqTemp>mqNew) OR SimAnneal(mqTemp, mqNew, temp), this statement checks if neighbor C has a MO greater than any seen thus far or if the simulated annealing function SimAnneal( . . . ) allows a 1-neighbour of lower quality. If so, C may be saved as BestP and the improved flag may be set to true. SimAnneal( ) may be determined as follows:

$$SimAnneal(mq1, mq2, t)$$
$$\text{Float } \theta = random()$$
$$\text{if } (mq1 \leq mq2) \text{ AND } (\theta < e^{\frac{mq1-mq2}{t}})$$
$$\text{return true}$$
$$\text{return false}$$

For Float θ=random( ), random( ) may represent a random number between 0 and 1 generated uniformly. Next, in order to determine the MO for the input clustering (i.e., MQ_Init( . . . )), the grouping module 106 may receive the input clustering $\{C_1, C_2, \ldots, C_n\}$, and generate the output MQ for the input clustering. In order to determine the MQ for the input clustering, first $\epsilon_i$, which may be defined as the intra cluster distance for the cluster $C_i$, may be calculated as follows:

$$\epsilon_i = \Sigma_{v \in C_i, k \in V-C_i} weight(v,k) \qquad \text{Equation (13)}$$

Next $\rho_i$, which may be defined as the inter cluster distance between the cluster $C_i$, may be calculated as follows:

$$\mu_i = \Sigma_{v \in C_i, k \in C_i\{c\}} weight(v,k) \qquad \text{Equation (14)}$$

Based on the calculations of Equations (13) and (14), the MQ of input clustering may be calculated by first determining $CF_i$, which is the clustering factor for the $i^{th}$ cluster $C_i$.

$$\text{For each } i \in 1 \ldots n \; CF_i = \frac{\epsilon_i}{\epsilon_i + \mu_i} \qquad \text{Equation (15)}$$

Based on $CF_i$, MQ may be calculated as:

$$MQ = \Sigma_{i=1}^{i=n} CF_i \qquad \text{Equation (16)}$$

In order to determine the MQ for the new clustering (i.e., MQ_Recur( . . . )), the grouping module 106 may receive as inputs, the clustering $\{C_1, C_2, \ldots, C_n\}$, mqOld, node k, cluster $C_i$, and cluster $C_j$, and generate the output MQ for the new clustering. In order to determine the MQ for the new clustering, after movement $C_i=C_i-\{k\}$ and $C_j=C_j+\{k\}$, MQ may be recalculated as follows:

Equation (17)

$$MQ_{updated} = MQ - (CF_i + CF_j) + \frac{\varepsilon_i - \Delta_{k,i}}{\varepsilon_i + \mu_i - \left(\Delta_{k,i} + \sum_{\substack{1 \le m \le n \\ m \ne i}} \delta_{k,m}\right)} + \frac{\varepsilon_j + \Delta_{k,j}}{\varepsilon_j + \mu_j + \left(\Delta_{k,j} + \sum_{\substack{1 \le m \le n \\ m \ne j}} \delta_{k,m}\right)}$$

For Equation (17), $CF_r$ may represent the original clustering factor for the $r^{th}$ cluster $C_r$, $\Delta_{k,i} = \Sigma_{v \in C_i}$weight(k, v). Further, $\Delta_{k,j} = \Sigma_{v \in C_j}$weight(k, v), and $\delta_{k,m} = \Sigma_{v \in C_m}$weight(k, v). $\epsilon_i$ may represent the (original) inter cluster distance for the cluster $C_i$. $\epsilon_j$ may represent the (original) inter cluster distance for the cluster $C_j$. $\mu_{i,m}$ may represent the original intra cluster distance between the clusters $C_i$ and $C_m$. $\mu_{j,m}$ may represent the original intra cluster distance between the clusters $C_j$ and $C_m$.

Referring to FIG. 1, the interface generation module 107 is described.

For the interface generation module 107, using the clusters generated by the grouping module 106 and the source code of the application, the interface generation module 107 may generate component interfaces by identifying methods of all the classes in each cluster, which are being called by the classes in other clusters. For example, the interface generation module 107 may identify public methods of all the classes in each cluster. A list of such methods may be used to define the interfaces of each cluster. For example, in a JAVA programming language based application, a public method in a class may be identified by the presence of qualifier word "public" together with the method definition.

Referring to FIG. 1, the dependency determination module 108 is described.

For the dependency determination module 108, using the clusters generated by the grouping module 106 and the dependency graph $G_{dep}$ populated by the class analysis module 104, the dependency determination module 108 may output component interactions. The dependency determination module 108 may generate an inter cluster interaction graph, for example, in GraphML format. In order to generate the inter cluster interaction graph for each cluster pair (e.g., clusters N and M), the dependency determination module 108 may generate the list of (public) methods of cluster N, which are being called by the classes in cluster M. This list may define the inbound dependencies between clusters N and M. Next, an inbound dependency graph for the clusters may be generated as follows. First, for each cluster, there is a node with cluster number as a node identification (ID). If the list of inbound dependencies between clusters N and M as generated by the dependency determination module 108 is not empty, there may be a directed edge from node with ID N to node with ID M, with an attribute as the list of methods in the list.

Referring to FIG. 1, the application portfolio module 109 is described.

The application portfolio module 109 may provide for clustering of application portfolios. Thus, in addition to component discovery for a particular application, a user may choose to perform application clustering for multiple applications. For example, the application portfolio module 109 may create clustering of classes within each application separately and generate clustering among applications. Clustering of application portfolios may begin by feature extraction performed by the class analysis module 104 for each application, similarity estimation between identified classes by the similarity determination module 105, and generation of clusters within the source code by the grouping module 106. Each of the functions performed by the modules 104, 105 and 106 may be applied to each application separately. In order to estimate similarities between applications, first textual similarity may be determined by creating a text vector for each application as a multi-set union of the vectors for the classes in the application. Next, tf-idf may be applied by recalculating the idf factor across all classes appearing in all applications. The cosine similarity for each pair of applications may be calculated using the text vectors calculated for each application. Next, class name similarity may be determined in a similar manner as discussed above with regard to creating a text vector for each application and applying tf-idf. The similarity for each pair of applications may be estimated in a similar manner as discussed above with regard to calculation of class name similarity between pairs of classes. Next, cross component dependencies may be identified and structural similarity may be estimated as discussed above with regard to collapsing edges with the same method name, automated weighing, collapsing edges between each pair of vertices, and weight normalization. A combined similarity may be determined in a similar manner as discussed above as a linear combination of the textual similarity, class name similarity, and dependency based similarity. Using the combined similarity, applications may be clustered in a similar manner as discussed above with regard to clustering performed by the grouping module 106.

Figure 2:
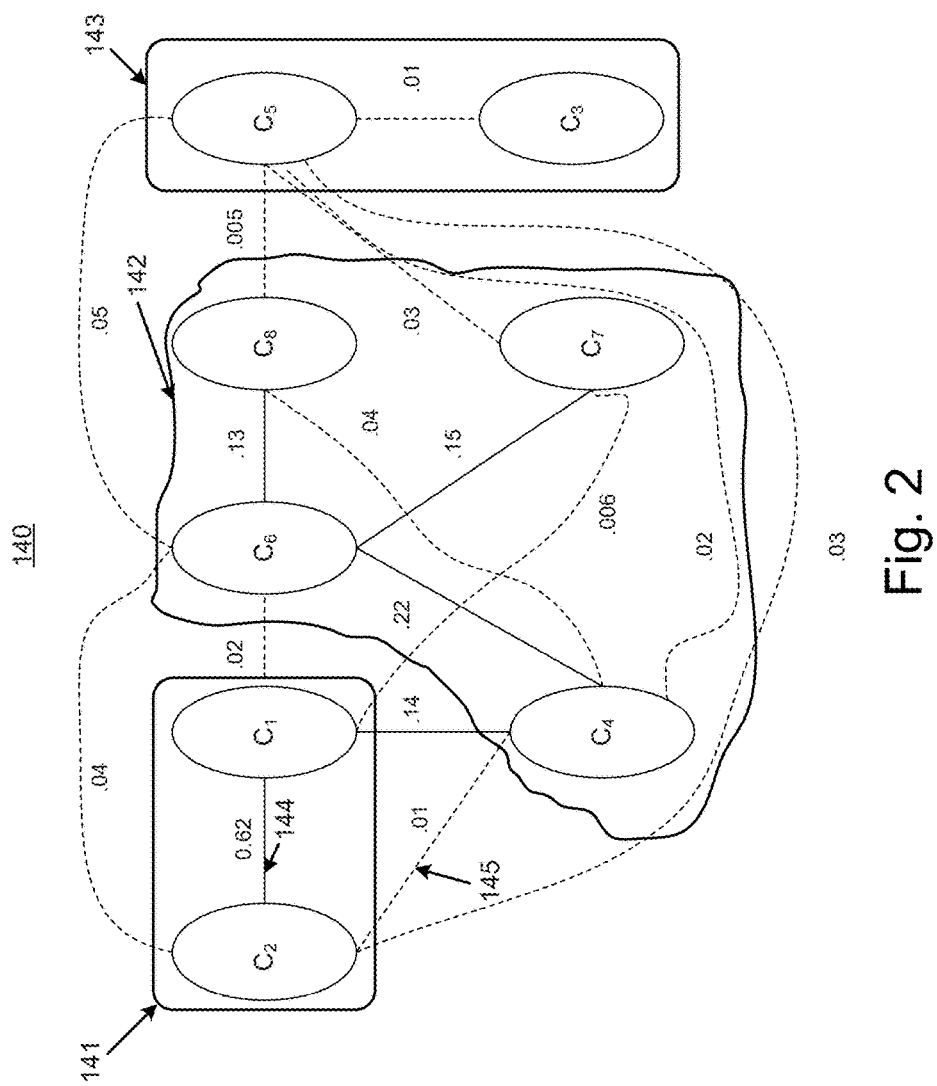
FIG. 2 illustrates an architecture for clusters for the component discovery system, according to an example of the present disclosure.
Figure 3:
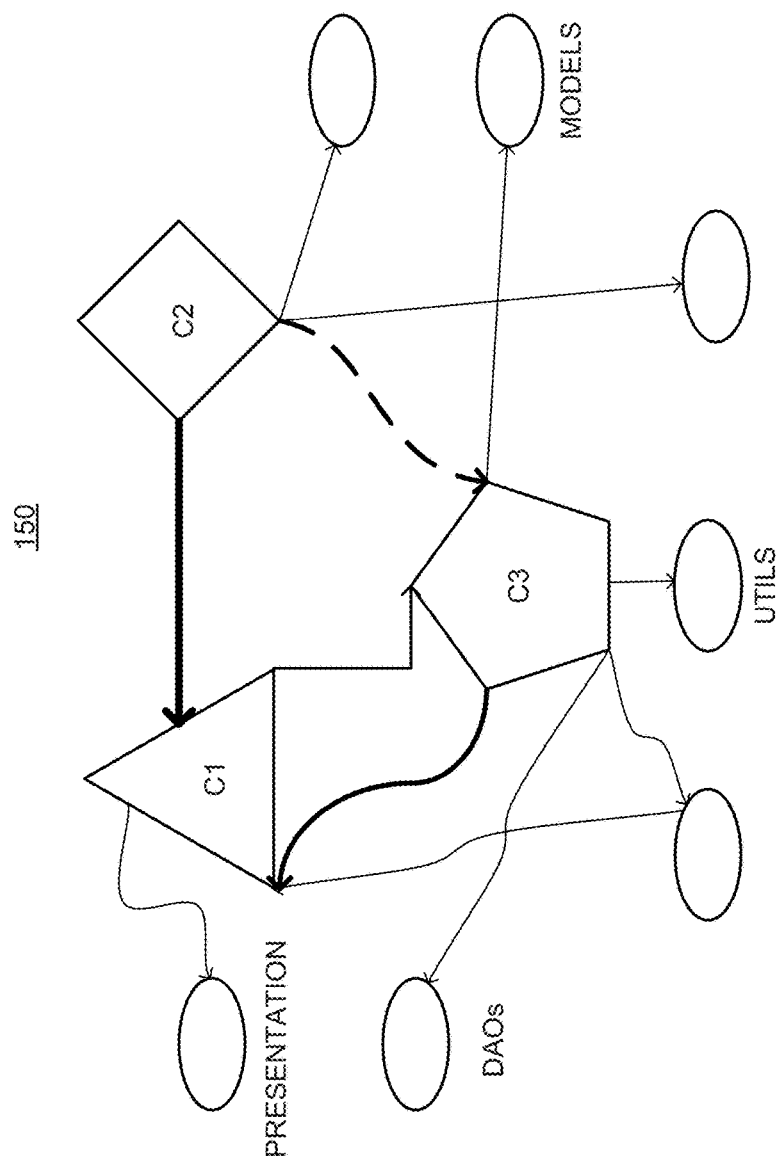
FIG. 3 illustrates an architecture for components for the component discovery system, according to an example of the present disclosure.

Referring to FIGS. 1-3, the output module 110 is described. Further, referring to FIGS. 4-14, the user interface 102 is described in further detail with reference to the features of the output module 110.

The output module 110 may provide for automatic labeling of the clusters and thereby providing names for components of an application, generation of a visual depiction of the components based on the interfaces and inter-component dependencies, identification of borderline classes, mapping of functional entities to components, and component hierarchy determination. Generally, for component hierarchy determination, at a first level of hierarchy, each component, which is effectively a cluster, may include a set of classes. At higher levels, a component may include a set of components, for example, from one level down in the component hierarchy. For component interfaces, for a cluster of classes, a component interface may include a list of methods by which other components can invoke the services offered by the classes within the component. For inter component dependencies, component to component dependency may describe the set of methods by which components interact with each other.

With regard to auto-labeling of the components, the output module 110 may use two approaches. For the first approach, the most frequent (i.e., having high tf-idf values) concept words appearing in class names for classes contained in a component may be selected. As a default, the top five concept words may be selected. Based on these concept words that signify the dominant functions implemented by a component, the component may be labeled accordingly. The centroid of the cluster may be identified and marked in the component diagram as the center of the component. For the second approach, the output module 110 may apply linear discriminant analysis (LDA) to extract the top dominant terms (e.g., top five dominant terms) using the class-names, textual vectors, and public method identifiers.

With regard to visual depiction of the components based on the interfaces and inter-component dependencies, the output module 110 may display each cluster generated by the grouping module 106, for example, as a polygon or another user defined shape. For the example of the polygon, nodes of the polygon may correspond to classes in the cluster and edges between each pair of classes may have strength corresponding to the combined similarity between the corresponding classes as estimated by the similarity determination module 105. For example, as shown in FIG. 2, an architecture 140 for clusters for the component discovery system 100 is described. The architecture 140 generally includes polygon 141 including classes $C_1$ and $C_2$, polygon 142 including classes $C_4$, $C_6$, $C_7$ and $C_8$, and polygon 143 including classes $C_3$ and $C_5$. For polygon 141 for example, edge 144 between classes $C_1$ and $C_2$ shows a strength of 0.62 corresponding to the combined similarity between classes $C_1$ and $C_2$ as estimated by the similarity determination module 105. The strengths between the remaining class pairs are shown in a similar manner. The output module 110 may classify combined similarity, for example, into five groups: (0, 0.2], (0.2, 0.4], (0.4, 0.6], (0.6, 0.8], and (0.8, 1]. For each group, a different edge type may be selected with different edge thickness. For example, as shown in FIG. 2, for edge 144, the similarity of 0.62 may include a different edge thickness than a similarity of 0.01 for edge 145. Using graph visualization techniques, the inter component interactions discovered by the dependency determination module 108 may be displayed. The output module 110 may display the interaction between the discovered clusters and the classes scoped out by the class identification module 103 using a dependency graph of the application. For example, as shown in FIG. 3, for the architecture 150 for components C1, C2 and C3, in addition to displaying the component interactions, the data access, presentation, models, and utilities used may be displayed.

With regard to identification of borderline classes, the output module 110 may identify classes which have high similarity with a class from some other cluster. The identified classes may be displayed in the component diagram, such as the diagram of FIG. 3. A user may manually reassign these borderline classes to other clusters. Based on user reassignment, component interfaces generated by the interface generation module 107, component interactions determined by the dependency determination module 108, and auto-labeling and visual depiction of the clusters by the output module 110 may be re-determined.

With regard to mapping of functional entities to components, the output module 110 may obtain user-input related to a general functional model including functional entity descriptions. The descriptions may be single word names or more elaborate textual descriptions. In order to map functional entities to components, the output module 110 may convert each functional entity (i.e., name) into a word vector. The functional entity may be separated into distinct words. For example, if the functional entity name is "automated booking process", this name may be separated into the list of words—{"automated", "booking", "process"}. Word stemming may be applied to bring the words to their roots. Next, for synonym expansion, for each of the words, based, for example, on a language thesaurus, synonyms of the words may be added in the list of words, which also appear in the application source code (i.e., IR tokens extracted by the class analysis module 104, T being the union of all the IR tokens extracted). For example, after stemming, the word list {"automate", "book", "process"} may be expanded into {"automate", "automatize", "automatise", "mechanize", "book", "reserve", "engage", "process", "procedure", "method"}. For these words, the functional entity may be represented as a vector analogous to a document vector in the co-occurrence matrix C (i.e., the co-occurrence matrix populated by the similarity determination module 105). Next, for each of the words in the vector, if the word also appears in the list of previously extracted IR tokens (i.e., IR tokens extracted by the class analysis module 104), tf-idf based automated weighting may be applied in a similar manner as discussed earlier with respect to the co-occurrence matrix C. Otherwise, if the word only appears in the functional entity name, its idf factor may be applied as ln N, where N may denote the number of classes in the application. For each cluster, cluster level class name concept vectors may be generated by summing the class level text vectors (i.e., by using Equation (3)) for the classes constituting the cluster. Next, cluster level sets of the class names may be generated by summing the class level vectors of word concepts appearing in the class names for the classes constituting the cluster. The similarity between each of the functional entities and clusters may be calculated using the text and the class names concept vectors generated as discussed above. The clusters may be ranked in decreasing order of their distances from each of the functional entities. For each functional entity, the clusters having a similarity more than a predetermined or a user-defined minimum threshold may be selected. Lastly, the functional entity may be visualized and/or reported to component mapping by the output module 110.

With regard to cluster hierarchy determination, after the generation of initial clusters by the grouping module 106, the output module 110 may considered each cluster as an atomic code object. These code-objects may be clustered together using the same partitioning based clustering using the maximization of the MQ, in a similar manner as the selection criteria applied by the grouping module 106. The similarity between two clusters may be calculated as the normalized summation of the similarity scores between the pairs of entities (e.g., classes for the first level of clusters) across the clusters. Specifically, the similarity between two clusters may be calculated by letting two clusters $CL_1 = \{c_{11}, c_{12}, \ldots, c_{1k}\}$ and $CL_2 \{c_{21}, c_{22}, \ldots, c_{2r}\}$ be the output of previous level of clustering. Similarity between $CL_1$ and $CL_2$ may be calculated as follows:

$$sim(CL_1, CL_2) = \frac{1}{k*r} \sum_{(c_{1j}, c_{2l}) \in CL_1 \times CL_2} sim(c_{1j}, c_{2l}) \quad \text{Equation (18)}$$

This process may be repeated to higher levels of hierarchy until there is a single cluster or MQ cannot increase any further since similarities between any two code objects is relatively very low (e.g., approximately zero).

Figure 5:
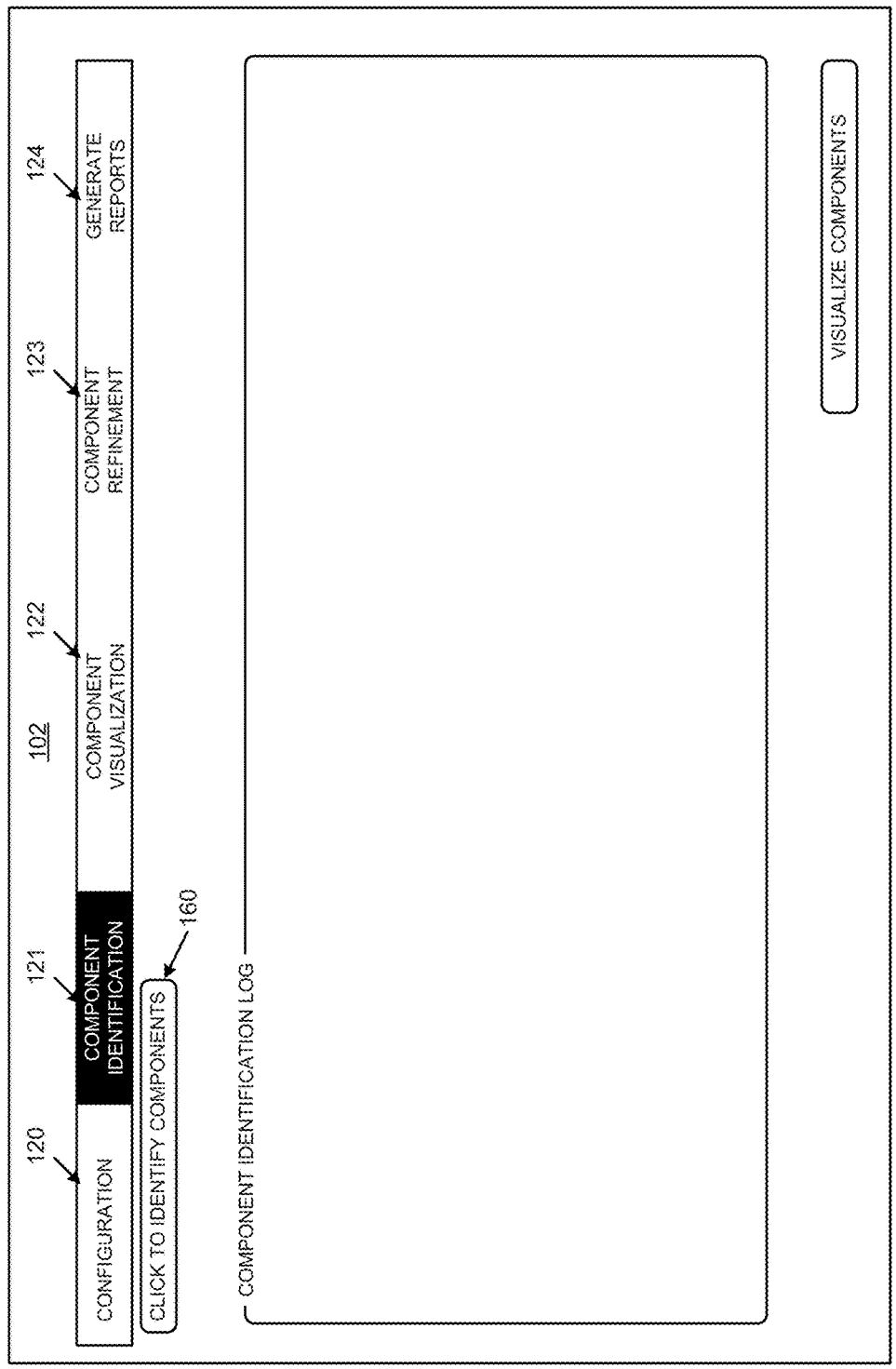
FIG. 5 illustrates a user interface layout for initiating component identification, according to an example of the present disclosure.
Figure 6:
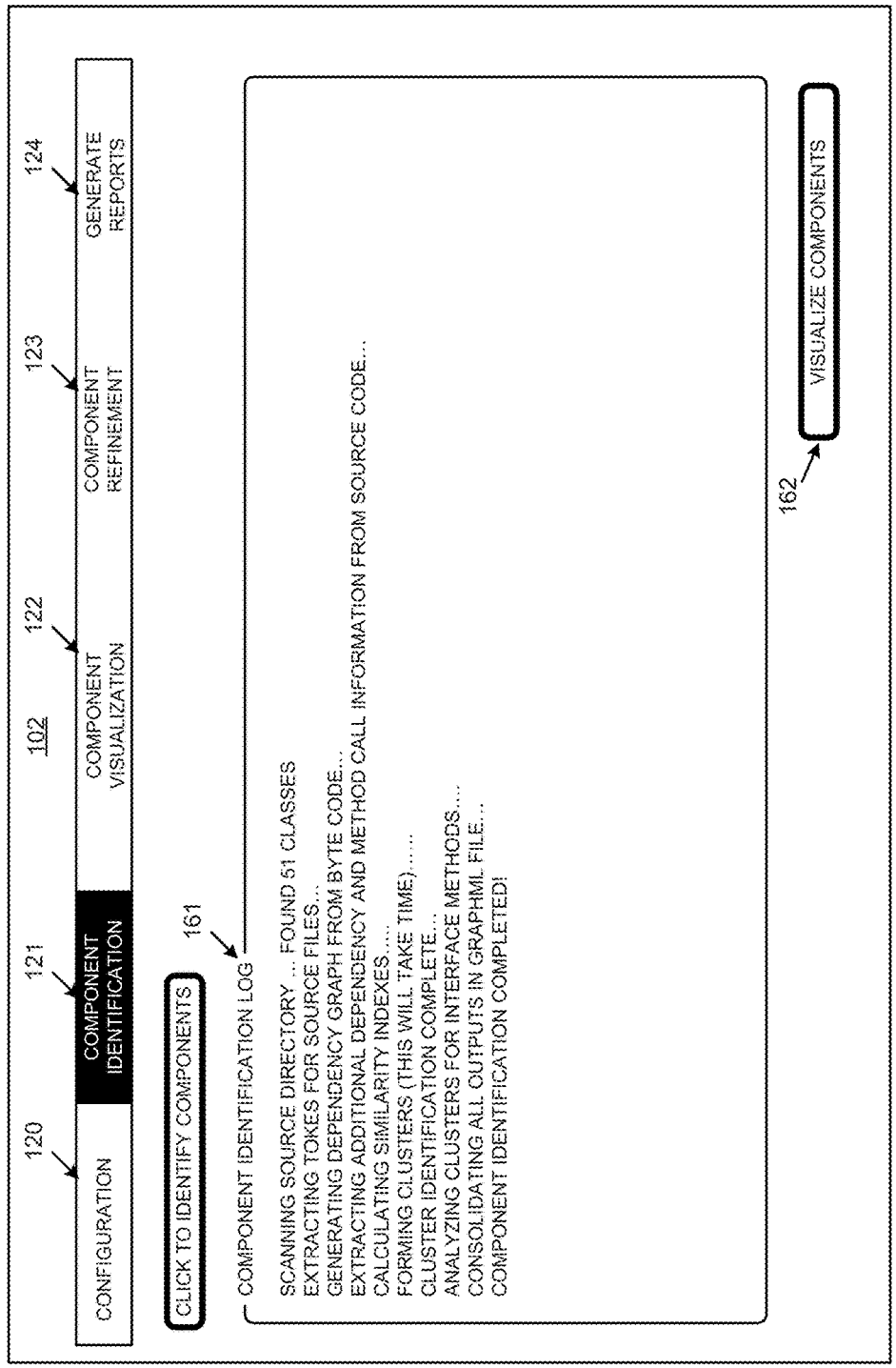
FIG. 6 illustrates a user interface display for a component identification log, according to an example of the present disclosure.

Referring to FIG. 5, the user interface layout 102 for initiating component identification is described, according to an example of the present disclosure. In order to initiate component identification, a user may perform the configuration set-up as described above with reference to FIG. 4. With the configuration for an application being set, referring to FIG. 5, the user may initiate component identification at 160. Referring to FIG. 6, the system 100 may perform the operations described above with reference to the modules 103-108, and list the various processes in a component identification log at 161. In order to visualize components, the user may initiate visualization at 162.

Figure 7:
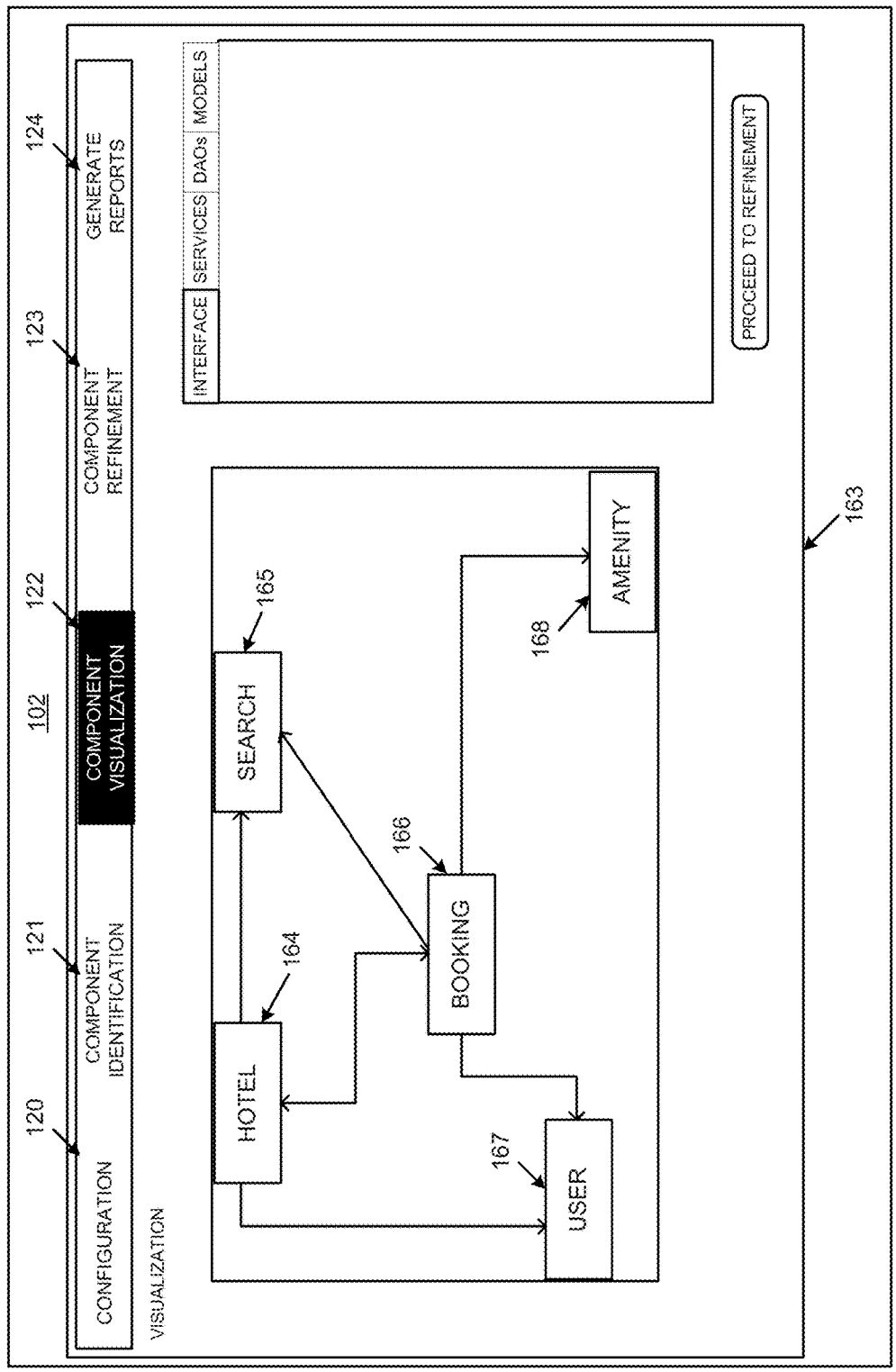
FIG. 7 illustrates a user interface display for component visualization, according to an example of the present disclosure.

Referring to FIG. 7, an example of a user interface display 163 for component visualization is shown. The user interface display 163 may show an architecture illustrating a visual depiction of components, including interfaces and inter-component dependencies. For the example of FIG. 7, the components may include hotel at 164, search at 165, booking at 166, user at 167 and amenity at 168.

Figure 8:
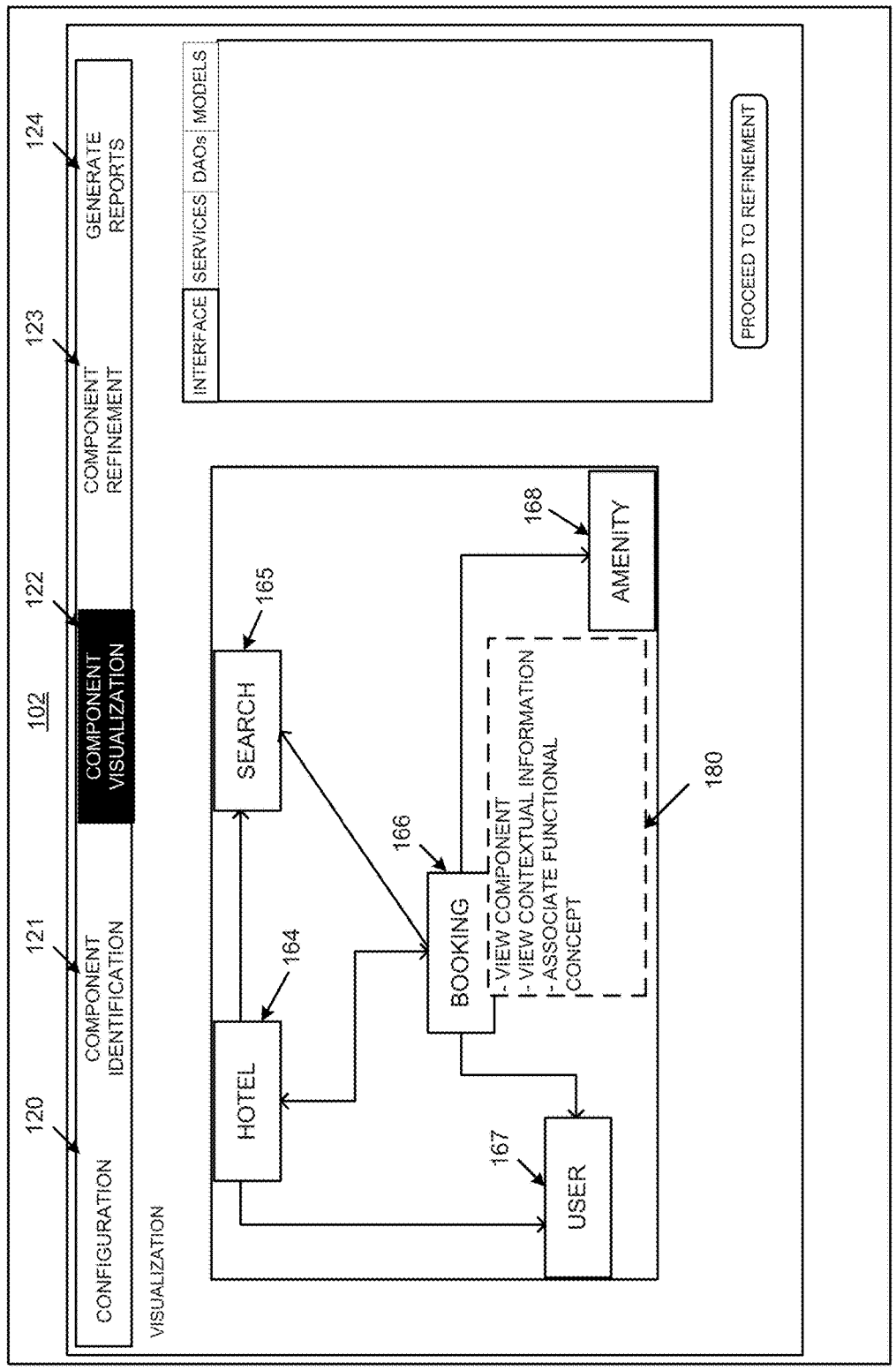
FIG. 8 illustrates a user interface display for options related to component visualization, according to an example of the present disclosure.
Figure 9:
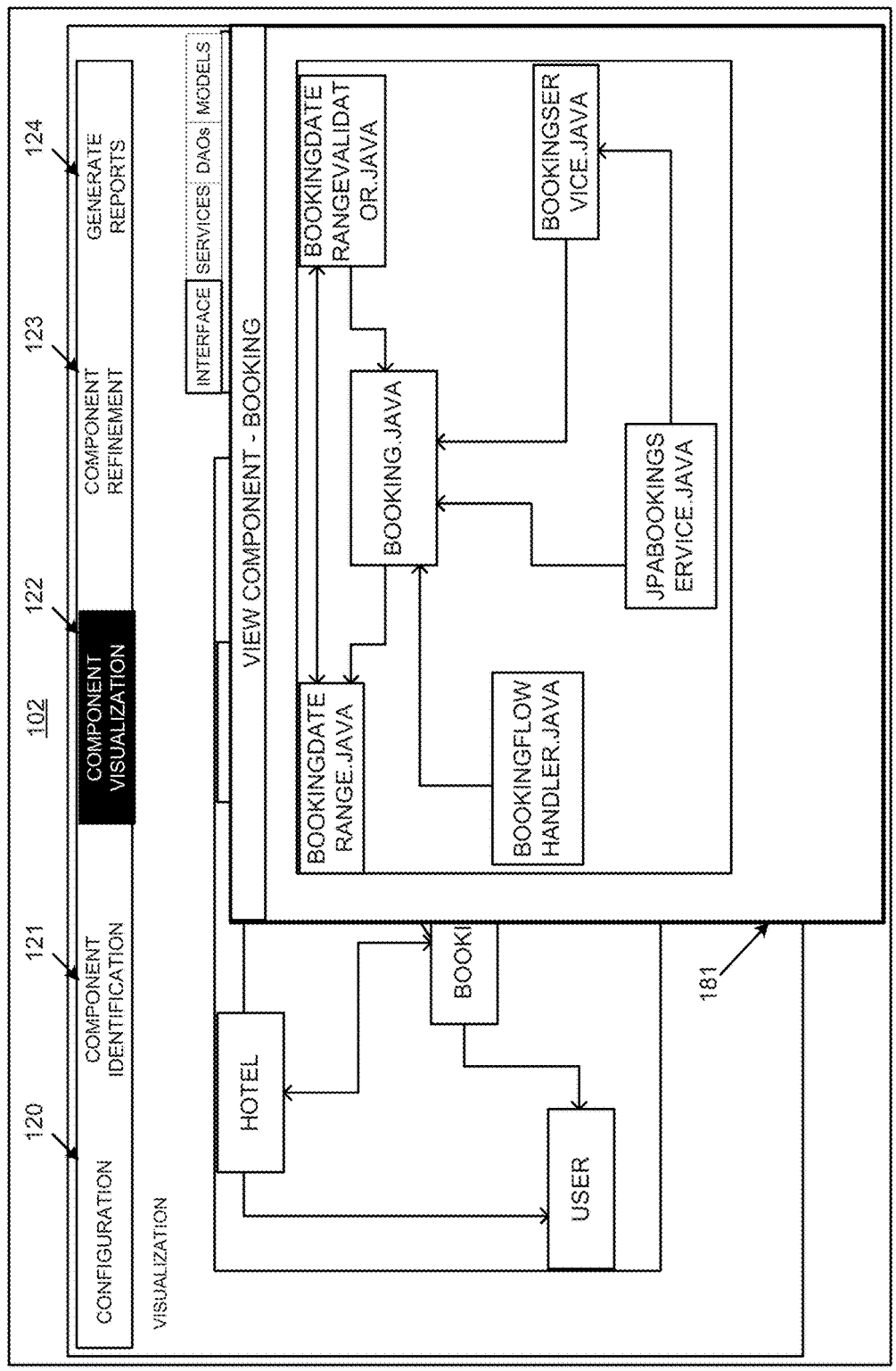
FIG. 9 illustrates a user interface display for visualizing component constituent classes, according to an example of the present disclosure.
Figure 10:
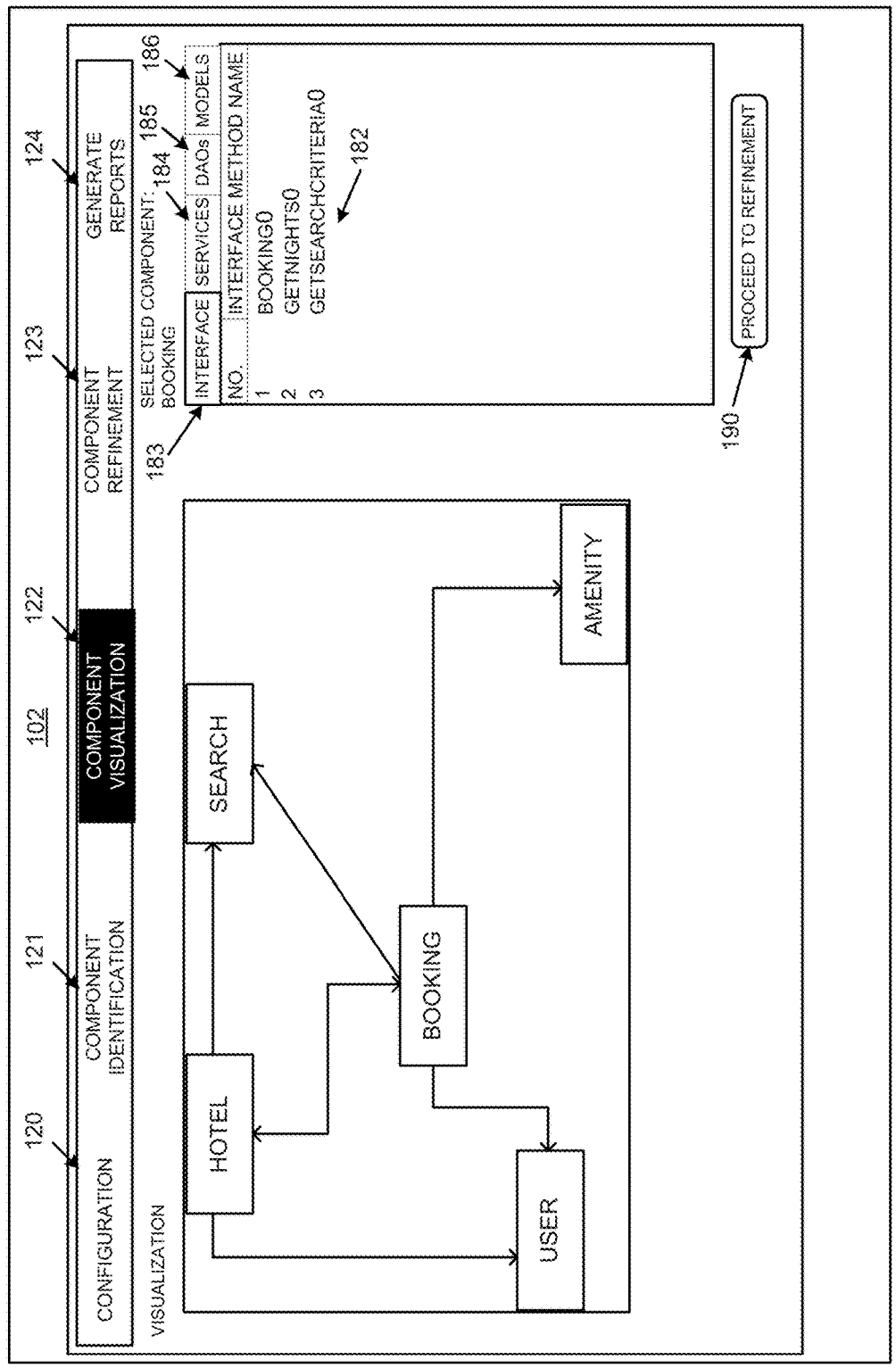
FIG. 10 illustrates a user interface display for visualizing component interfaces, according to an example of the present disclosure.
Figure 11:
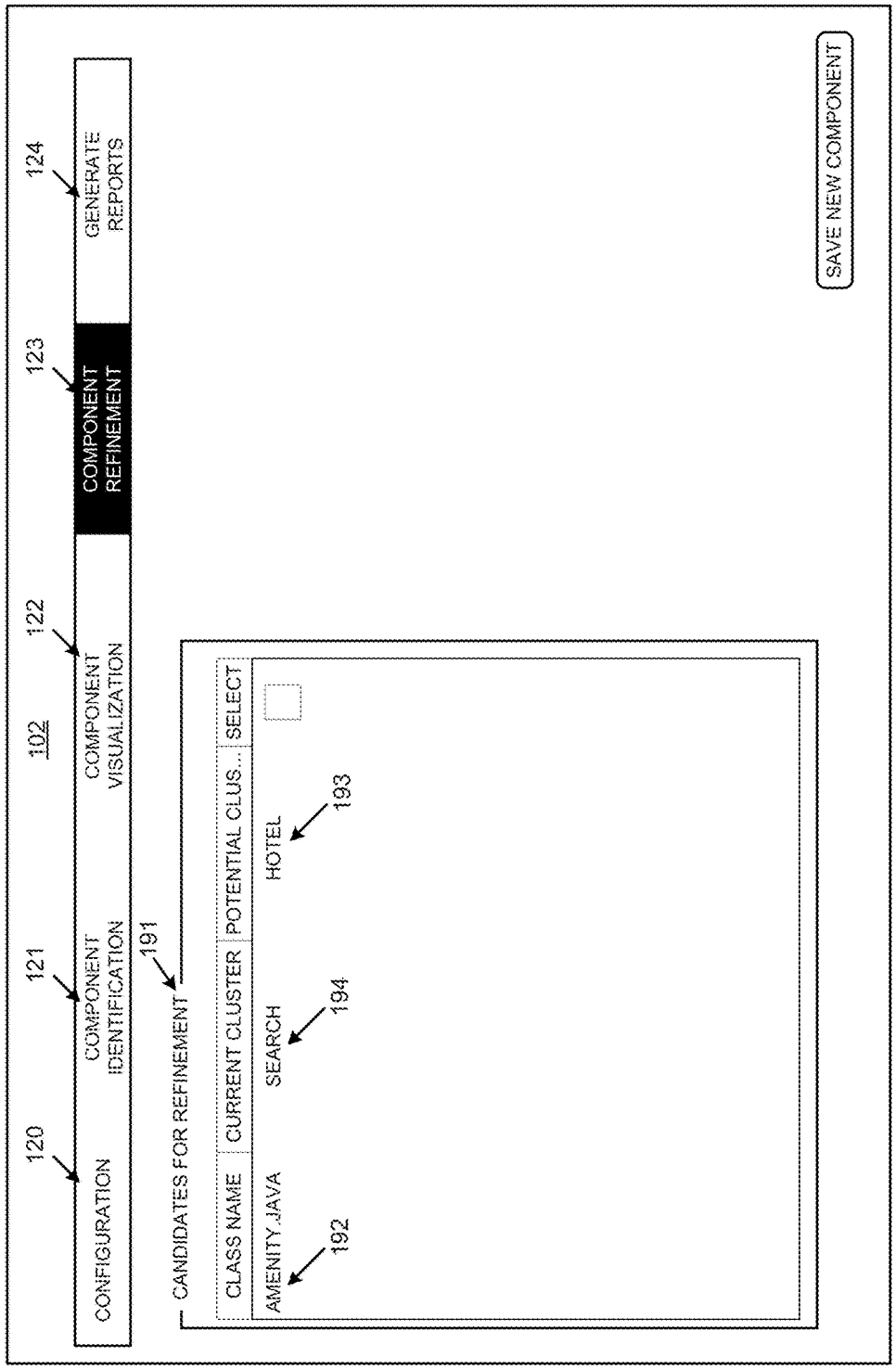
FIG. 11 illustrates a user interface display for component refinement, according to an example of the present disclosure.

Referring next to FIG. 8, a user interface display 180 for options related to component visualization is shown. The user interface display 180 may allow a user to view the various classes inside a component. A user may further view contextual information and proceed with association of functional concepts. For example, by selecting the option for viewing the component booking at 166, referring to FIG. 9, the various component constituent classes of the component booking at 166 are illustrated at 181. Referring to FIG. 10, component interfaces 182 may be displayed by selecting the interface option at 183. Additionally, a user may view services such as logging, auditing, data persistence, Extensible Markup Language (XML) parsing etc., DAOs and models by selecting options 184, 185 and 186.

Figure 12:
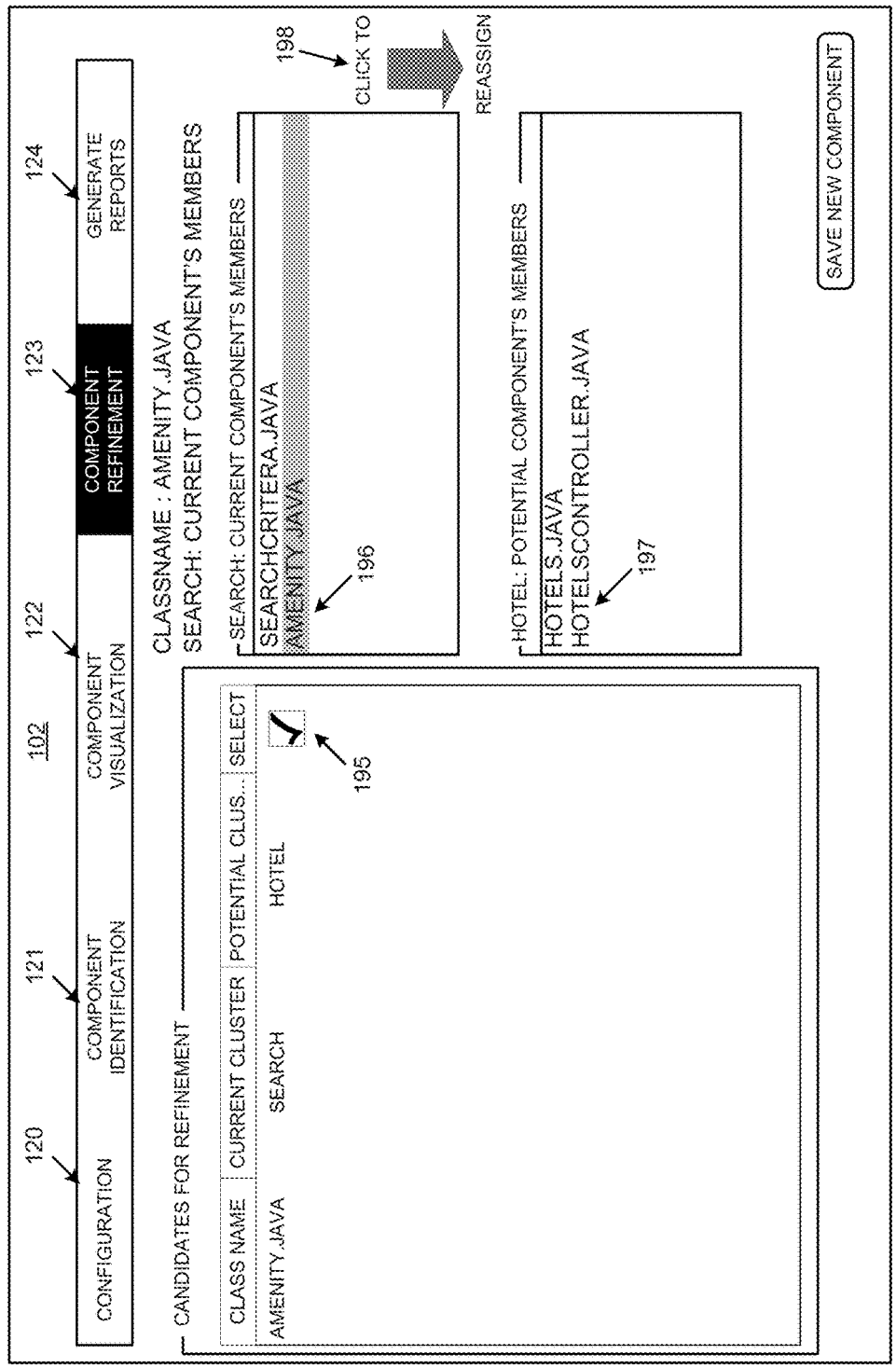
FIG. 12 illustrates another user interface display illustrating options for component refinement, according to an example of the present disclosure.
Figure 13:
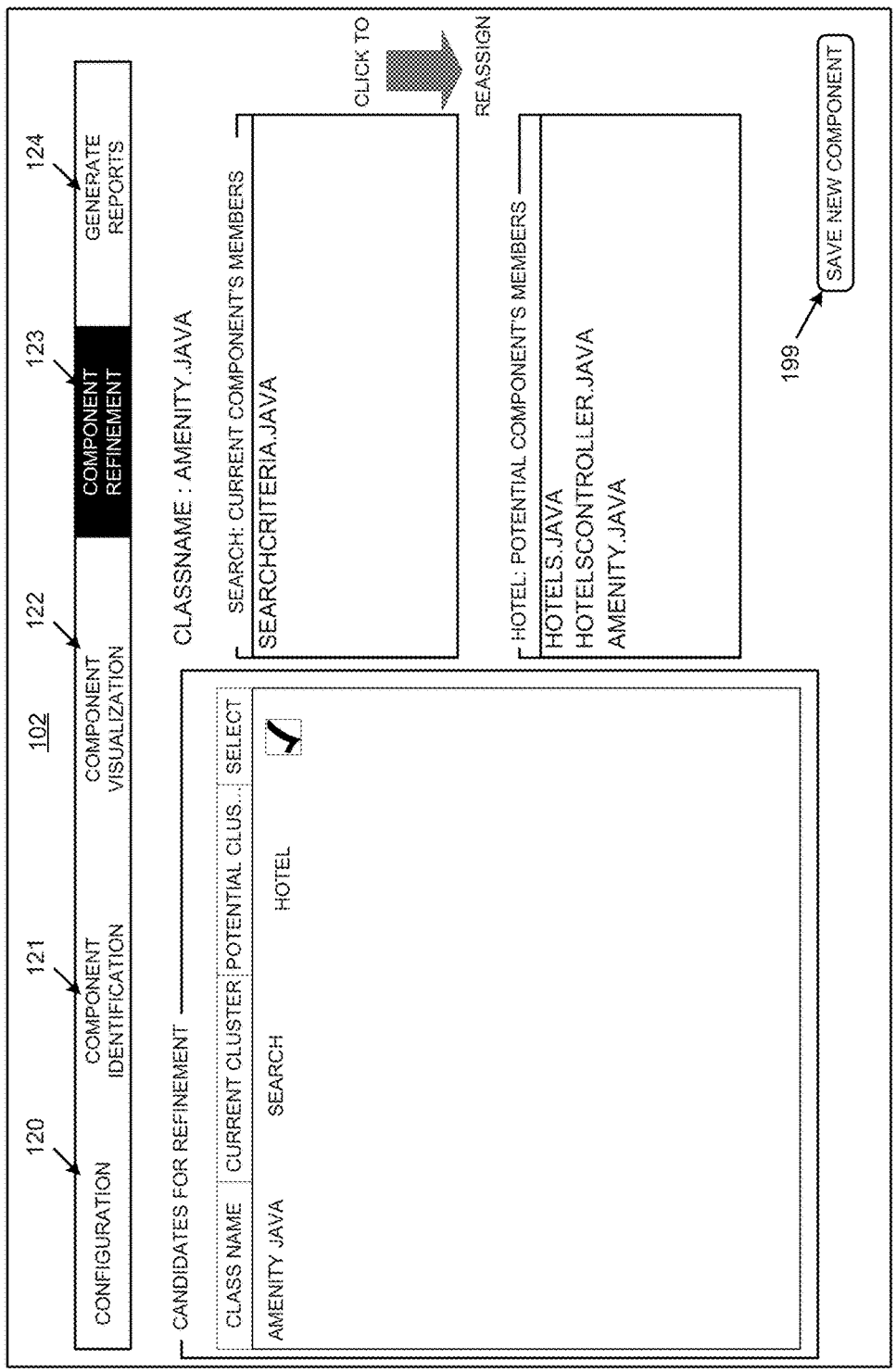
FIG. 13 illustrates another user interface display illustrating reassignment of a component, according to an example of the present disclosure.

Referring to FIG. 10, based on the inspection of the various components, a user may refine the components by selecting the option at 190. For example, by selecting the "Proceed to Refinement" option at 190, referring to FIG. 11, candidates for refinement may be displayed at 191. The candidates for refinement may be based on borderline classes as discussed above. For example, a class named "amenity.java" at 192 may belong to a potential cluster "hotel" at 193 instead of a current cluster "search" at 194. Referring to FIG. 12, by selecting the option to refine at 195, the classes for cluster "search" and cluster "hotel" may be displayed at 196, 197. The user may select the class named "amenity.java", and by selecting the option to reassign at 198, as shown in FIG. 13, the class named "amenity.java" may be reassigned to cluster "hotel". The new component layout may be saved at 199. As discussed above, component interfaces generated by the interface generation module 107, component interactions determined by the dependency determination module 108, and auto-labeling and visual depiction of the clusters by the output module 110 may be re-determined.

Figure 14:
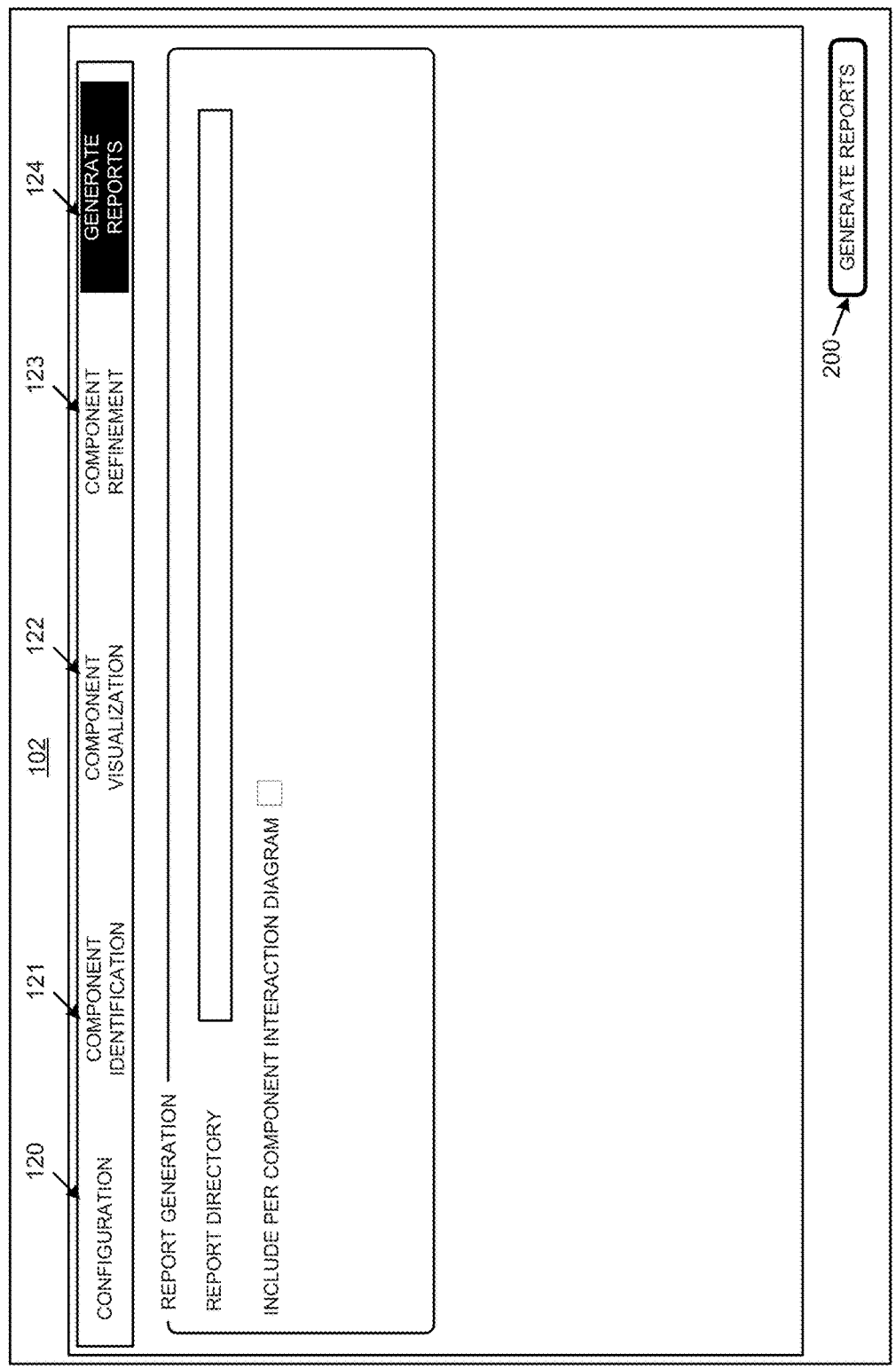
FIG. 14 illustrates a user interface layout for report generation, according to an example of the present disclosure.

Referring to FIG. 14, a user interface layout for report generation is illustrated. By selecting the option at 200, a user may generate reports including details of the component identification processes listed in the component identification log of FIG. 6. A user may further generate reports providing graphs of various component interaction diagrams as described herein.

Figure 15:
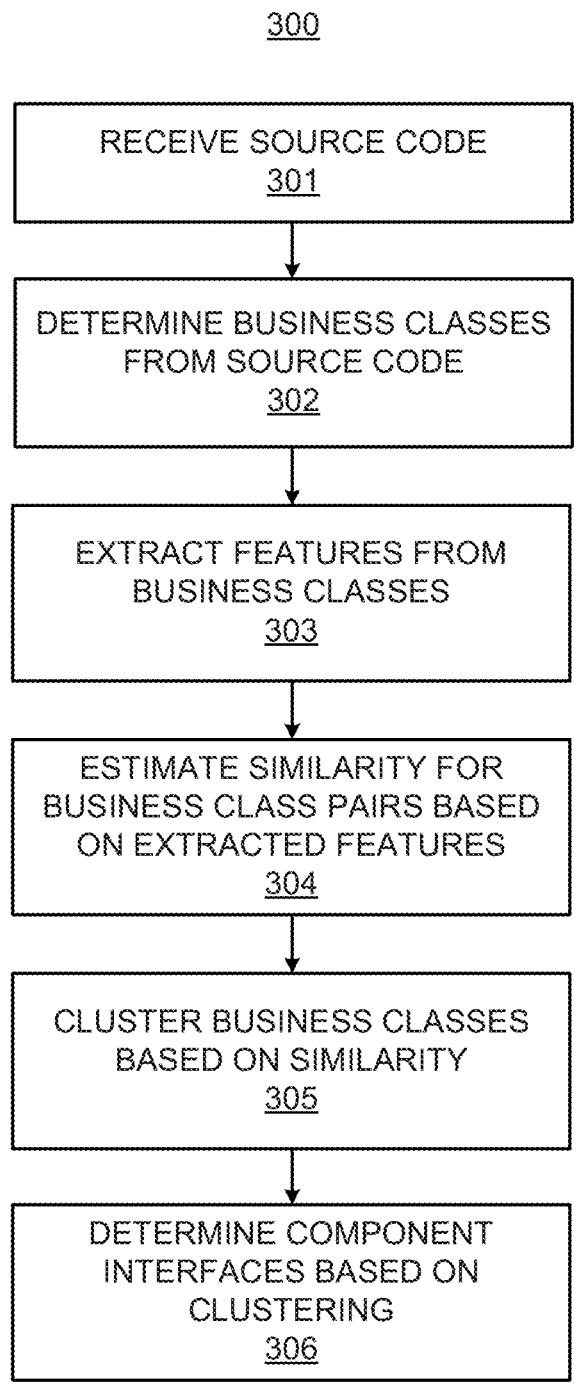
FIG. 15 illustrates a method for component discovery, according to an example of the present disclosure.
Figure 16:
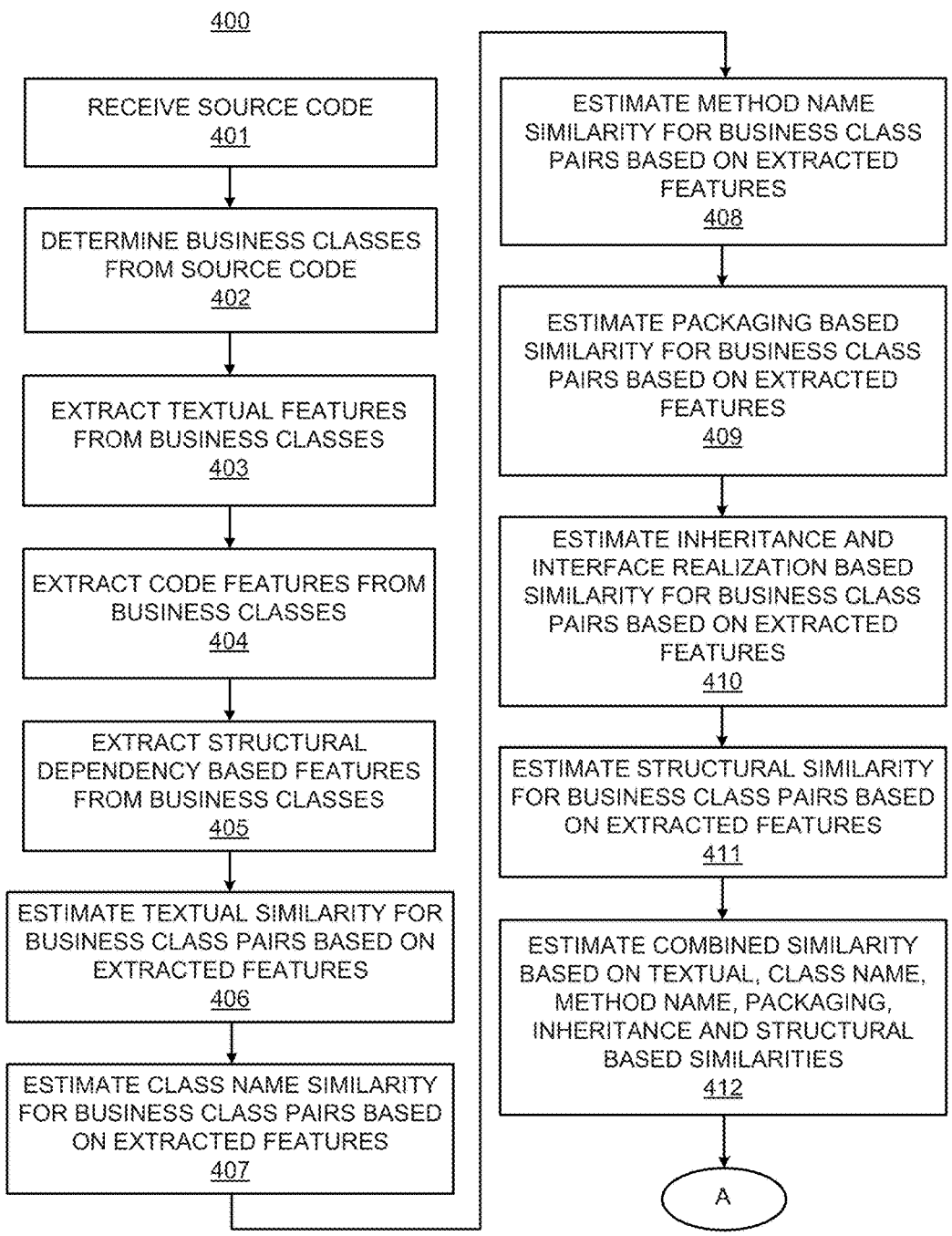
FIG. 16 illustrates further details of a method for component discovery, according to an example of the present disclosure.
Figure 16:
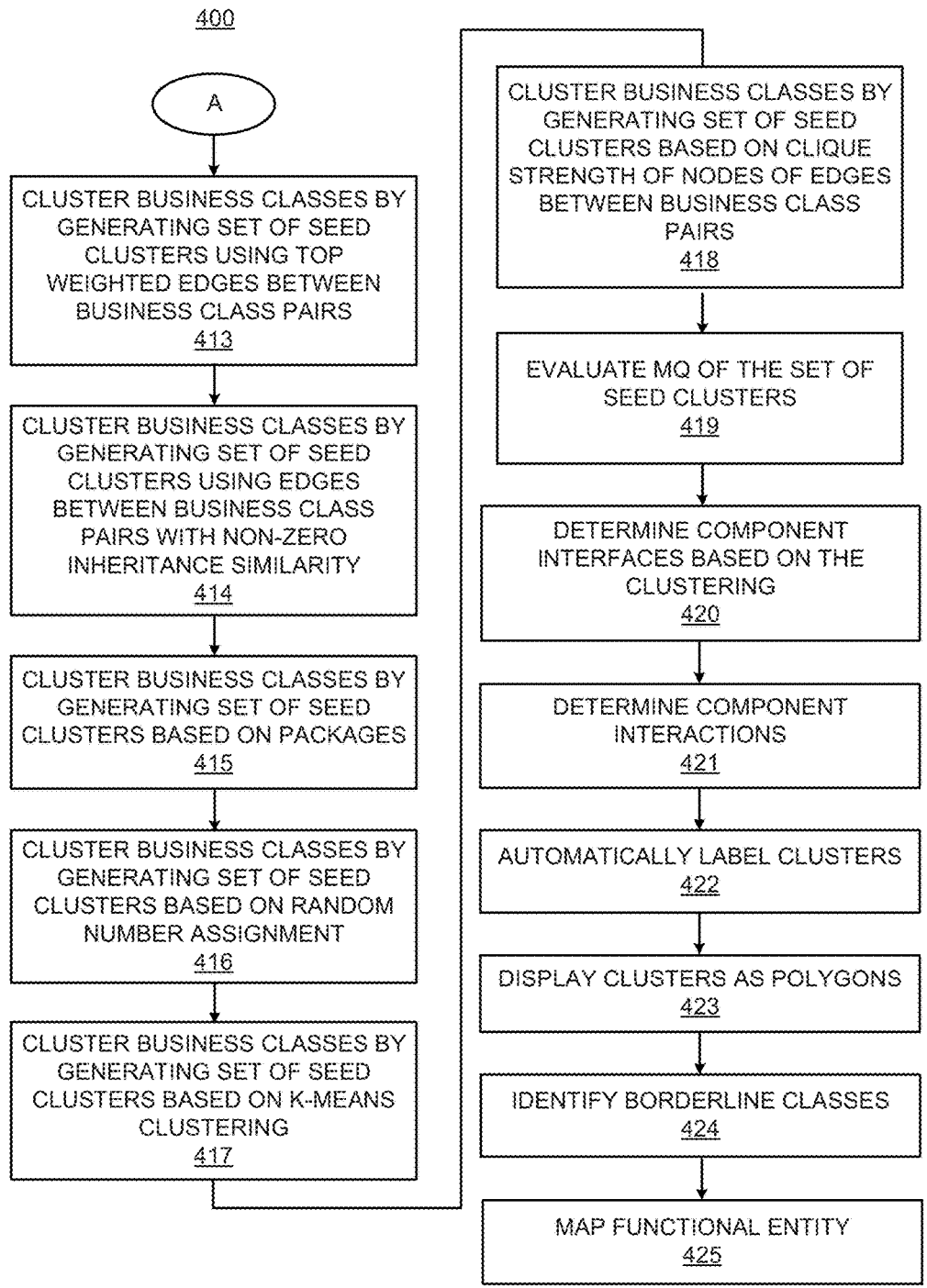

FIGS. 15 and 16 illustrate flowcharts of methods 300 and 400 for component discovery, according to examples. The methods 300 and 400 may be implemented on the component discovery system described above with reference to FIGS. 1-14 by way of example and not limitation. The methods 300 and 400 may be practiced in other systems.

Referring to FIG. 15, at block 301, source code may be received. For example, referring to FIG. 1, the input module 101 may include a user interface 102 to receive OO source code to be analyzed.

At block 302, business classes may be determined by excluding packages and classes in the source code identified as belonging to a presentation layer, as belonging to a data access layer, as models and/or as utilities. For example, referring to FIG. 1, the class identification module 103 may scope and identify classes to be analyzed in the source code. For example, the class identification module 103 may identify classes in a business layer of the source code.

At block 303, features may be extracted from the business classes. For example, referring to FIG. 1, the class analysis module 104 may extract features for similarity assessment for each identified class.

At block 304, similarity for business class pairs may be estimated based on the extracted features. For example, referring to FIG. 1, the similarity determination module 105 may estimate a similarity between identified classes by analyzing the extracted features. For example, the similarity determination module 105 may estimate a similarity between pairs of identified classes.

At block 305, the business classes may be clustered based on the similarity. The clusters generated by the clustering may represent components of the source code. For example, referring to FIG. 1, the grouping module 106 may generate clusters within the source code by grouping similar classes. The clusters may be designated as components of an application and labeled.

At block 306, interfaces for the components may be determined based on the clustering. For example, referring to FIG. 1, the interface generation module 107 may generate interfaces between classes for each cluster.

Referring to FIG. 16, the method 400 for component discovery is described.

At block 401, source code may be received (see also block 301 of FIG. 15).

At block 402, business classes may be determined by excluding packages and classes in the source code identified as belonging to a presentation layer, as belonging to a data access layer, as models and/or as utilities (see also block 302 of FIG. 15). The business classes may include suffixes manager, service or EJB session beans.

At block 403, textual features may be extracted from the business classes. For example, extracting textual features may include extracting IR tokens from source code comments and identifiers.

At block 404, code features may be extracted from the business classes. For example, extracting code features may include extracting concept words embedded in business class names, extracting concept words embedded in public method identifiers used in the business classes, extracting packaging information for the business classes, and extracting inheritance and interface realization relationships for the business classes.

At block 405, structural dependency based features may be extracted from the business classes. For example, extracting structural dependency based features may include determining a function call in the source code for a first business class that calls a function for a second business class.

At block 406, textual similarity for business class pairs may be estimated based on the extracted features. Estimating textual similarity may include populating a co-occurrence matrix that accounts for a frequency of occurrence of IF tokens in a business class, applying tf-idf based automated weighting to the co-occurrence matrix, and calculating textual similarity for the business class pairs by evaluating co-occurrence matrices corresponding to the business class pairs.

At block 407, class name similarity for business class pairs may be estimated based on the extracted features. Estimating class name similarity may include populating a class name matrix that accounts for a frequency of occurrence of word concepts in a business class name, applying tf-idf based automated weighting to the class name matrix, and calculating class name similarity for the business class pairs by evaluating class name matrices corresponding to the business class pairs.

At block 408, method name similarity for business class pairs may be estimated based on the extracted features. For example, estimating method name similarity may include populating a method name matrix that accounts for a frequency of occurrence of word concepts embedded in public methods of a business class, applying tf-idf based automated weighting to the method name matrix, and calculating method name similarity for the business class pairs by evaluating method name matrices corresponding to the business class pairs.

At block 409, packaging based similarity for business class pairs may be estimated based on the extracted features. For example, estimating packaging based similarity may include calculating packaging based similarity for the business class pairs by evaluating packaging information for the business classes.

At block 410, inheritance and interface realization based similarity for business class pairs may be estimated based on the extracted features. Estimating inheritance and interface realization based similarity may include, for example, including a class name in an inheritance and interface realization list for a current business class, including names of other business classes in the inheritance and interface realization list that have the class name of the current business class in inheritance and interface realization lists of the other business classes, and calculating inheritance and interface realization based similarity for the business class pairs based on evaluation of the inheritance and interface realization list for the current business class and an inheritance and interface realization list for the other business classes.

At block 411, structural similarity for business class pairs may be estimated based on the extracted features. Estimating structural similarity may include collapsing edges with a same method name, automated weighing, collapsing edges between each pair of vertices and weight normalization, as discussed above.

At block 412, a combined similarity for the business class pairs may be determined based on evaluation of the textual, class name, method name, packaging, inheritance and structural based similarities.

At block 413, the business classes may be clustered based on the similarity determination. The clusters generated by the clustering may represent components of the source code. For example, clustering may include generating a set of seed clusters by using top weighted edges between business class pairs.

The edges may represent the similarity for the business class pairs. The generated seed clusters may be designated $P_1$.

At block 414, the business classes may be clustered by generating a set of seed clusters by using edges between business class pairs with non-zero inheritance similarity. The generated seed clusters may be designated $P_2$.

At block 415, the business classes may be clustered based on packages. The generated seed clusters may be designated $P_3$.

At block 416, the business classes may be clustered based on random number assignment. The generated seed clusters may be designated $P_4$.

At block 417, the business classes may be clustered based on k-means clustering. The generated seed clusters may be designated $P_5$.

At block 418, the business classes may be clustered by generating a set of seed clusters based on a clique strength of nodes of edges between business class pairs. The nodes may represent the business classes. The generated seed clusters may be designated $P_6$.

At block 419, a MQ of the set of seed clusters may be evaluated. The MQ of clusters may be maximized based on movement of nodes between the clusters.

At block 420, interfaces for the components may be determined based on the clustering. The interfaces may identify public methods of the business classes in a cluster that are called by the business classes of other clusters.

At block 421, component interactions may be determined based on public methods of a cluster that are called by the business classes of another cluster.

At block 422, clusters may be automatically labeled by extracting dominant terms using class-names, textual vectors, and public method identifiers. For example, referring to FIG. 1, the output module 110 may provide for automatic labeling of clusters.

At block 423, clusters may be displayed as a polygon with nodes corresponding to the business classes in the cluster and edges between pairs of the business classes corresponding to the similarity for the business class pairs. For example, referring to FIG. 1, the output module 110 may provide for displaying of clusters.

At block 424, borderline classes may be identified by identifying the business classes in a first cluster having a high similarity to the business classes in another cluster.

At block 425, a functional entity may be mapped to a component by calculating a similarity between the functional entity and a cluster. For example, referring to FIG. 1, the output module 110 may provide for mapping of functional entities to components.

Figure 17:
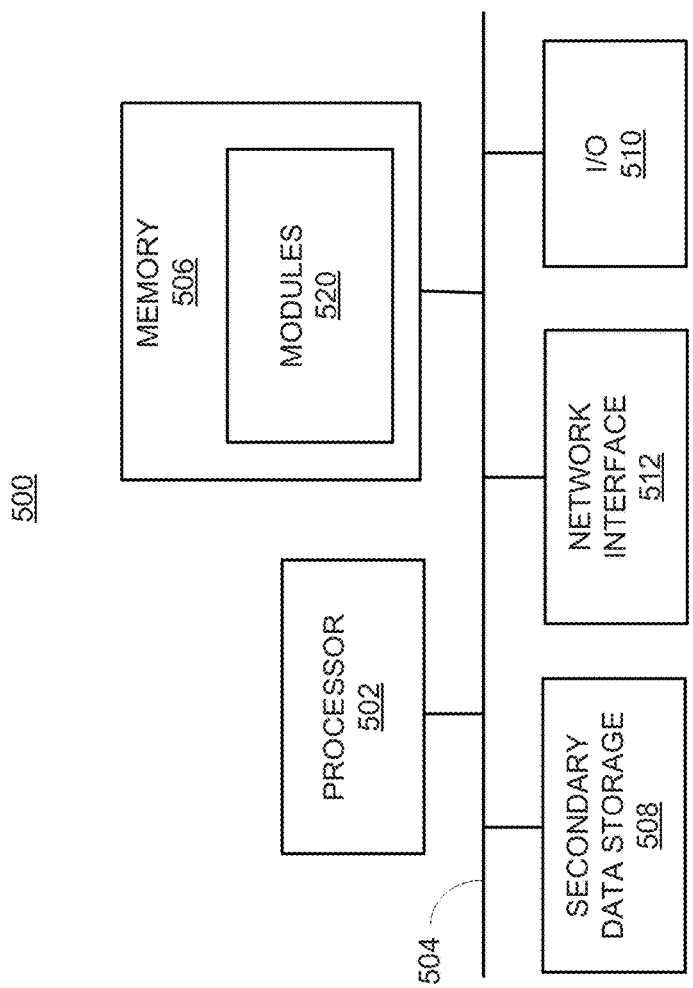
FIG. 17 illustrates a computer system, according to an example of the present disclosure.

FIG. 17 shows a computer system 500 that may be used with the examples described herein. The computer system 500 represents a generic platform that includes components that may be in a server or another computer system. The computer system 500 may be used as a platform for the system 100. The computer system 500 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 includes a processor 502 that may implement or execute machine readable instructions performing some or all of the methods, functions and other processes described herein. Commands and data from the processor 502 are communicated over a communication bus 504. The computer system 500 also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include modules 520 including machine readable instructions residing in the memory 506 during runtime and executed by the processor 502. The modules 520 may include the modules of the system 100 shown in FIGS. 1-14.

The computer system 500 may include an I/O device 510, such as a keyboard, a mouse, a display, etc. The computer system 500 may include a network interface 512 for connecting to a network. Other known electronic components may be added or substituted in the computer system 500.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A method for component discovery from source code, the method performed by a processor and comprising:
   receiving source code;
   determining business classes by determining a component identification boundary in the source code;
   extracting features from the business classes by extracting packaging information for each of the business classes, wherein extracting packaging information for each of the business classes includes
      extracting concept words embedded in business class names,
      extracting a packaging hierarchy as a string, and
      extracting a substring that describes the packaging hierarchy;
   estimating similarity for business class pairs based on the extracted features;
   clustering the business classes based on the similarity, wherein clusters generated by the clustering represent components of the source code; and
   determining interfaces for the components based on the clustering.

2. The method of claim 1, wherein extracting features from the business classes further comprises:
   extracting inheritance and interface realization relationships for each of the business classes.

3. The method of claim 1, wherein clustering the business classes based on the similarity further comprises:
   generating partitions for the clusters by determining, for each node in a cluster, whether the node belongs to the cluster or to a different cluster, wherein the node represents a business class; and
   moving, based on the determination that the node belongs to the different cluster, the node to the different cluster.

4. The method of claim 1, wherein estimating similarity for business class pairs based on the extracted features further comprises:
   determining, based on the extracted packaging information, packaging based similarity for the business class pairs.

5. The method of claim 1, wherein clustering the business classes based on the similarity further comprises:
   generating seed populations by sorting a list of edges between business class pairs; and
   generating, based on the seed populations, a set of seed clusters.

6. The method of claim 1, further comprising:
   mapping functional entities to the components by separating each of the functional entities into distinct words; and
   determining, based on the separation of each of the functional entities into distinct words, a similarity between each of the functional entities and the components.

7. A component discovery system comprising:
   a processor; and
   a memory storing machine readable instructions that when executed by the processor cause the processor to:
      determine business classes by excluding packages and classes in source code;
      extract textual features from the business classes by extracting packaging information for each of the business classes, wherein extracting packaging information for each of the business classes includes
         extracting concept words embedded in business class names,
         extracting a packaging hierarchy as a string, and
         extracting a substring that describes the packaging hierarchy;
      estimate similarity for business class pairs based on the extracted features;
      cluster the business classes based on the similarity by
         generating seed populations by sorting a list of edges between business class pairs, and
         generating, based on the seed populations, a set of seed clusters, wherein clusters generated by the clustering represent components of the source code; and
      determine interfaces for the components based on the clustering.

8. The component discovery system according to claim 7, wherein the machine readable instructions to extract the textual features from the business classes further comprise machine readable instructions that when executed by the processor further cause the processor to: extract inheritance and interface realization relationships for each of the business classes.

9. The component discovery system according to claim 7, wherein the machine readable instructions to cluster the business classes based on the similarity further comprise machine readable instructions that when executed by the processor further cause the processor to:
   generate partitions for the clusters by determining, for each node in a cluster, whether the node belongs to the cluster or to a different cluster, wherein the node represents a business class; and
   move, based on the determination that the node belongs to the different cluster, the node to the different cluster.

10. The component discovery system according to claim 7, wherein the machine readable instructions to estimate similarity for business class pairs based on the extracted features further comprise machine readable instructions that when executed by the processor further cause the processor to:
   determine, based on the extracted packaging information, packaging based similarity for the business class pairs.

11. The component discovery system according to claim 7, further comprising machine readable instructions that when executed by the processor further cause the processor to:
   map functional entities to the components by separating each of the functional entities into distinct words; and
   determine, based on the separation of each of the functional entities into distinct words, a similarity between each of the functional entities and the components.

12. A non-transitory computer readable medium having stored thereon machine readable instructions for component discovery, the machine readable instructions, when executed, cause a processor to:
   determine business classes by excluding packages and classes in source code;
   extract code features from the business classes by extracting packaging information for each of the business classes, wherein extracting packaging information for each of the business classes includes
      extracting concept words embedded in business class names, extracting a packaging hierarchy as a string, and
extracting a substring that describes the packaging hierarchy;
estimate similarity for business class pairs based on the extracted features;
cluster the business classes based on the similarity, wherein clusters generated by the clustering represent components of the source code; and
determine interfaces for the components based on the clustering by identifying public methods of the business classes in a cluster of the generated clusters that are called by the business classes of other clusters from the generated clusters.

13. The non-transitory computer readable medium according to claim 12, wherein the machine readable instructions to cluster the business classes based on the similarity further comprise machine readable instructions that when executed by the processor further cause the processor to:
generate partitions for the clusters by determining, for each node in a cluster, whether the node belongs to the cluster or to a different cluster, wherein the node represents a business class; and
move, based on the determination that the node belongs to the different cluster, the node to the different cluster.

14. The non-transitory computer readable medium according to claim 12, wherein the machine readable instructions to estimate similarity for business class pairs based on the extracted features further comprise machine readable instructions that when executed by the processor further cause the processor to:
determine, based on the extracted packaging information, packaging based similarity for the business class pairs.

15. The non-transitory computer readable medium according to claim 12, wherein the machine readable instructions to cluster the business classes based on the similarity further comprise machine readable instructions that when executed by the processor further cause the processor to:
generate seed populations by sorting a list of edges between business class pairs; and
generate, based on the seed populations, a set of seed clusters.

16. The non-transitory computer readable medium according to claim 12, further comprising machine readable instructions that when executed by the processor further cause the processor to:
extract inheritance and interface realization relationships for each of the business classes.

17. The non-transitory computer readable medium according to claim 12, further comprising machine readable instructions that when executed by the processor further cause the processor to:
map functional entities to the components by separating each of the functional entities into distinct words; and
determine, based on the separation of each of the functional entities into distinct words, a similarity between each of the functional entities and the components.

18. The non-transitory computer readable medium according to claim 12, further comprising machine readable instructions that when executed by the processor further cause the processor to:
cluster a plurality of application portfolios that each includes a plurality of applications that use different types of source code including the source code.

19. The non-transitory computer readable medium according to claim 12, further comprising machine readable instructions that when executed by the processor further cause the processor to:
determine similarity between different pairs of the clusters based on a normalized summation of similarity scores between the business class pairs across the clusters.

20. The non-transitory computer readable medium according to claim 12, further comprising machine readable instructions that when executed by the processor further cause the processor to:
use k-means clustering to generate initial clusters that are used to cluster the business classes.

* * * * *